United States Patent
Lu

(10) Patent No.: US 12,148,465 B2
(45) Date of Patent: Nov. 19, 2024

(54) METHOD OF OPERATING AN INTEGRATED CIRCUIT AND INTEGRATED CIRCUIT

(71) Applicant: TAIWAN SEMICONDUCTOR MANUFACTURING COMPANY, LTD., Hsinchu (TW)

(72) Inventor: Shih-Lien Linus Lu, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 18/295,154

(22) Filed: Apr. 3, 2023

(65) Prior Publication Data

US 2023/0238057 A1     Jul. 27, 2023

Related U.S. Application Data

(62) Division of application No. 17/217,215, filed on Mar. 30, 2021, now Pat. No. 11,621,036.

(60) Provisional application No. 63/051,656, filed on Jul. 14, 2020.

(51) Int. Cl.
| | |
|---|---|
| G06F 21/44 | (2013.01) |
| G06F 21/75 | (2013.01) |
| G11C 11/4074 | (2006.01) |
| G11C 11/4096 | (2006.01) |
| G11C 11/419 | (2006.01) |

(52) U.S. Cl.
CPC ........ *G11C 11/419* (2013.01); *G11C 11/4074* (2013.01); *G11C 11/4096* (2013.01); *G06F 21/44* (2013.01); *G06F 21/75* (2013.01)

(58) Field of Classification Search
CPC .............. G11C 11/419; G11C 11/4074; G11C 11/4096; G06F 21/44; G06F 21/75
USPC ......................................................... 365/154
See application file for complete search history.

(56) References Cited

U.S. PATENT DOCUMENTS

| | | | |
|---|---|---|---|
| 7,486,576 B2 | 2/2009 | Choi et al. | |
| 11,049,555 B1 | 6/2021 | Tsai et al. | |
| 2007/0263461 A1 | 11/2007 | Choi | |
| 2011/0185208 A1 | 7/2011 | Iwamoto et al. | |
| 2013/0145199 A1 | 6/2013 | Fu et al. | |
| 2019/0258581 A1 | 8/2019 | Lee | |
| 2021/0064732 A1 | 3/2021 | Majerus et al. | |

FOREIGN PATENT DOCUMENTS

TW         201203271         1/2012

OTHER PUBLICATIONS

Office Action dated Jun. 23, 2022 for corresponding case No. TW 11120604070. (pp. 1-7).

*Primary Examiner* — Ly D Pham
(74) *Attorney, Agent, or Firm* — Hauptman Ham, LLP

(57) ABSTRACT

An integrated circuit includes a first memory cell array and a controller. The first memory cell array includes a first array of volatile memory cells having a first retention data time. The controller is coupled to the first memory cell array. The controller is configured to write data to each memory cell in the first memory cell array in response to the integrated circuit being successfully logged into, read data from each memory cell in the first memory cell array in response to the integrated circuit being powered on, and determine whether to allow an authentication operation of the integrated circuit in response to reading data from each memory cell in the first memory cell array.

20 Claims, 10 Drawing Sheets

METHOD OF OPERATING AN INTEGRATED CIRCUIT AND INTEGRATED CIRCUIT

PRIORITY CLAIM

The present application is a divisional of U.S. application Ser. No. 17/217,215, filed Mar. 30, 2021, now U.S. Pat. No. 11,621,036 issued Apr. 4, 2023, which claims the benefit of U.S. Provisional Application No. 63/051,656, filed Jul. 14, 2020, which is herein incorporated by reference in its entirety.

BACKGROUND

The semiconductor integrated circuit (IC) industry has produced a wide variety of digital devices to address issues in a number of different areas. Some of these digital devices, such as memory macros, are configured for the storage of data. As ICs have become smaller and more complex, the resistance of conductive lines within these digital devices are also changed affecting the operating voltages of these digital devices and overall IC performance.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
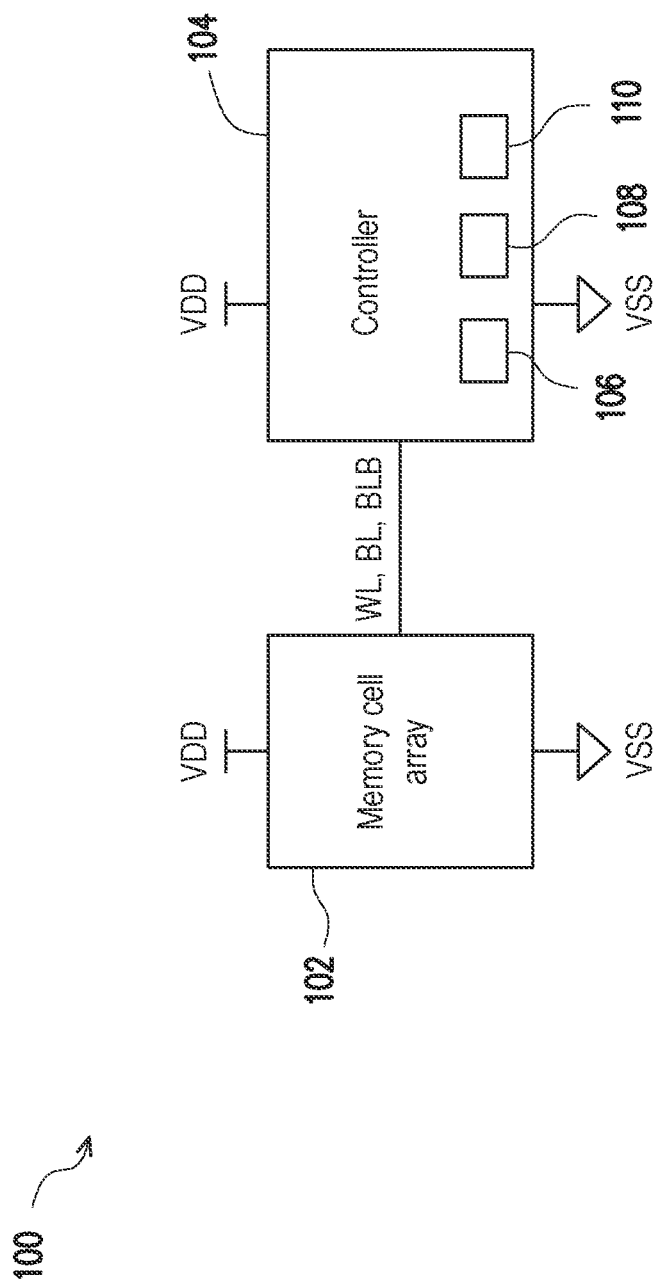
FIG. 1 is a block diagram of an integrated circuit, in accordance with some embodiments.

The following disclosure provides different embodiments, or examples, for implementing features of the provided subject matter. Specific examples of components, materials, values, steps, arrangements, or the like, are described below to simplify the present disclosure. These are, of course, merely examples and are not limiting. Other components, materials, values, steps, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In accordance with some embodiments, a method of operating an integrated circuit includes writing data to each memory cell in a first memory cell array of the integrated circuit, powering off the integrated circuit, powering on the integrated circuit, and reading data from each memory cell in the first memory cell array in response to powering on the integrated circuit.

In some embodiments, the method further includes determining whether to allow an authentication operation of the integrated circuit in response to reading data from each memory cell in the first memory cell array. In some embodiments, the authentication operation includes providing one or more log-in operations to a user of the integrated circuit.

In some embodiments, the data retention of the first memory cell array is configured to function as a log-in timer of the integrated circuit, and is usable by the integrated circuit to track a time duration since being powered off. Therefore, the integrated circuit of the present disclosure is configured to provide additional security of the contents of integrated circuit compared to other approaches.

FIG. 1 is a block diagram of an integrated circuit 100, in accordance with some embodiments. In the embodiment of FIG. 1, integrated circuit 100 is a memory macro.

Integrated circuit 100 includes a memory cell array 102 and a controller 104. Memory cell array 102 is coupled to controller 104. In some embodiments, memory cell array 102 is coupled to controller 104 by at least bit lines BL (FIG. 2), bit line bars BLB, word lines WL or other conductive lines. Controller 104 is configured to control memory cell array 102. In some embodiments, controller 104 is configured to provide one or more security measures (described below) to integrated circuit 100.

Figure 2:
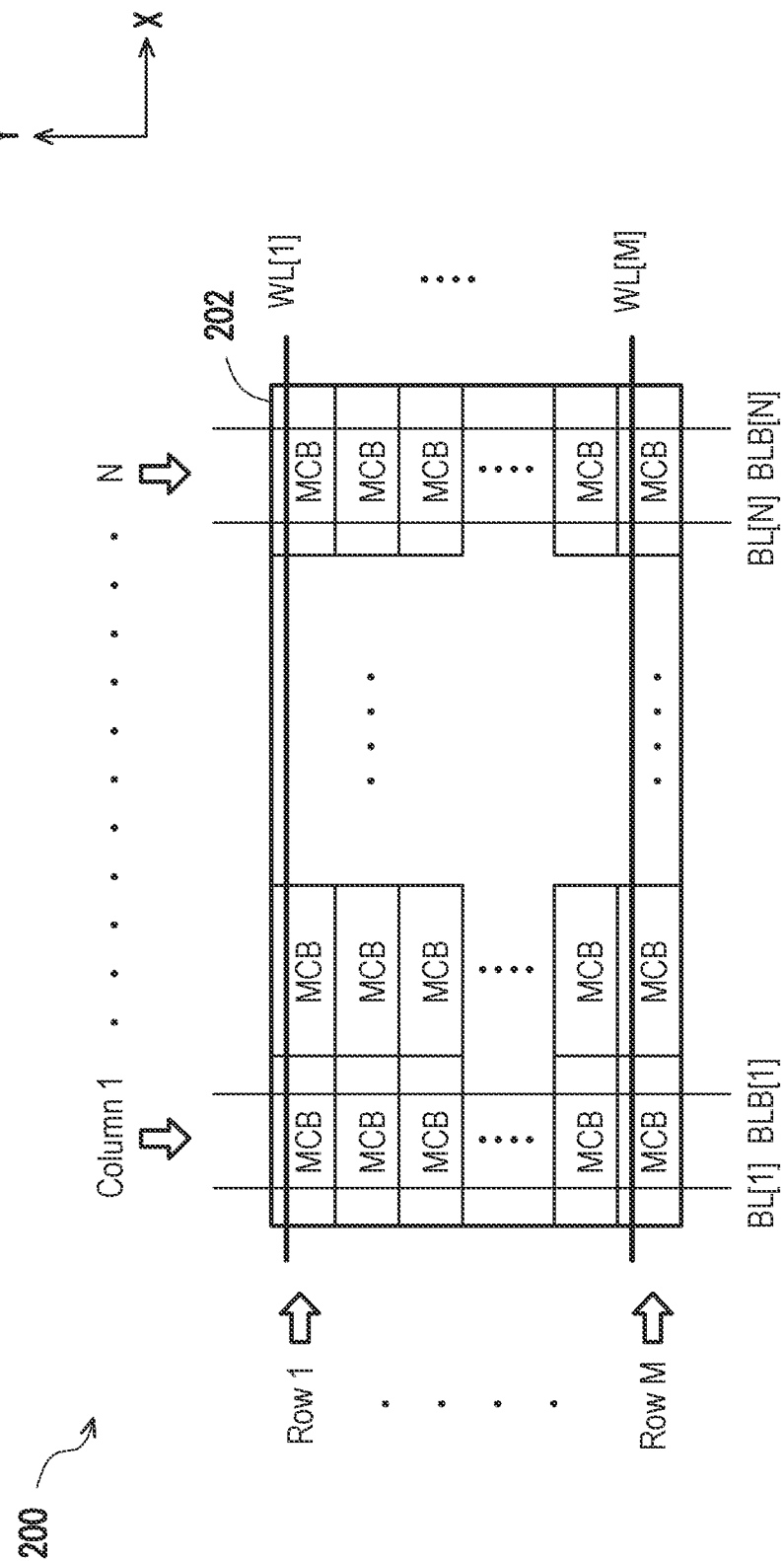
FIG. 2 is a circuit diagram of a memory circuit, in accordance with some embodiments.

Memory cell array 102 comprises an array of memory cells having M rows and N columns, where M and N are positive integers (shown in FIG. 2). In some embodiments, each memory cell in memory cell array 102 is configured to store 1 bit of data. In some embodiments, each memory cell in memory cell array 102 is configured to store more than a 1 bit of data.

In some embodiments, memory cell array 102 is a volatile memory cell array. In some embodiments, memory cell array 102 includes an array of volatile memory cells that are configured to lose the stored data within due to leakage current. In some embodiments, each memory cell in memory cell array 102 corresponds to a static random access memory (SRAM) cell. In some embodiments, each memory cell in memory cell array 102 corresponds to a single port, a dual port or a multi-port memory cell. In some embodiments, each memory cell in memory cell array 102 corresponds to a dynamic random access memory (DRAM) cell. In some embodiments, each memory cell in memory cell array 102 corresponds to an embedded dynamic random access memory (eDRAM) cell. Other types of memory cells in memory cell array 102 are within the contemplated scope of the present disclosure.

Other configurations and types of memory cells in memory cell array 102 are within the scope of the present disclosure.

Controller 104 includes an X-decoder circuit 106, a Y-decoder circuit 108 and a read circuit 110.

X-decoder circuit 106 is coupled to (not shown) memory cell array 102 by word lines WL. X-decoder circuit 106 is configured to generate word line signals (not shown) on corresponding word lines WL to memory cell array 102. In some embodiments, X-decoder circuit 106 includes word line driver circuits (not shown) coupled to the word lines WL, and the word line driver circuits (not shown) are configured to generate the word line signals that are sent to memory cell array 102.

In some embodiments, word line driver circuits (not shown) decode a row address of a memory cell in memory cell array 102 that is selected to be accessed in a read operation or a write operation. In some embodiments, the word line driver circuits (not shown) then supply a voltage to the selected word line corresponding to the decoded row address, and a different voltage to the other, unselected word lines. In some embodiments, the X-decoder circuit 106 is configured to generate the word line signals in response to a first set of control signals (not shown) received from controller 104.

Other configurations of X-decoder circuit 106 are within the scope of the present disclosure.

Y-decoder circuit 108 is coupled to (not shown) memory cell array 102 by bit lines BL and bit line bars BLB. In some embodiments, the term "bar" indicates a logically inverted signal. In these embodiments, for example, bit line bar BLB carries a signal logically inverted from a signal carried by bit line BL.

Y-decoder circuit 108 is configured to generate bit line signals (not shown) on corresponding bit lines BL to memory cell array 102, and configured to generate bit line bar signals (not shown) on corresponding bit line bars BLB to memory cell array 102.

In some embodiments, Y-decoder circuit 108 includes bit line driver circuits (not shown) coupled to the bit lines BL, and the bit line driver circuits (not shown) are configured to generate the bit line signals that are sent to memory cell array 102. In some embodiments, Y-decoder circuit 108 includes bit line bar driver circuits (not shown) coupled to the bit line bars BLB, and the bit line bar driver circuits (not shown) are configured to generate the bit line bar signals that are sent to memory cell array 102.

In some embodiments, bit line driver circuits (not shown) and bit line bar driver circuits (not shown) decode a column address of a memory cell in memory cell array 102 selected to be accessed in a write operation. In some embodiments, bit line driver circuits (not shown) then supply a voltage to the selected bit line corresponding to the decoded column address, and bit line bar driver circuits (not shown) then supply an inverted voltage to the selected bit line bar corresponding to the decoded column address. In some embodiments, the Y-decoder circuit 108 is configured to generate the bit line signals and the bit line bar signals in response to a second set of control signals (not shown) received from controller 104.

Other configurations of Y-decoder circuit 108 are within the scope of the present disclosure.

Read circuit 110 is coupled to memory cell array 102 (not shown) by bit lines BL and bit line bars BLB. Read circuit 110 is configured to read data stored in memory cell array 102 during a read operation. In some embodiments, read circuit 110 includes one or more sense amplifiers (not shown) configured to read data stored in memory cell array 102 in response to corresponding sense amplifier enable signals.

In some embodiments, two or more of at least X-decoder circuit 106, Y-decoder circuit 108 and read circuit 110 are combined into a single peripheral circuit. Other configurations of read circuit 110 are within the scope of the present disclosure.

In some embodiments, integrated circuit 100 corresponds to at least a radio frequency identification (RFID) card, a bank card, a payment card, or an identification (ID) card. In some embodiments, integrated circuit 100 corresponds to an intermittently powered device such as an internet of things (IoT) device.

Controller 104 and integrated circuit 100 include sensitive data that is protected by one or more security measures. In some embodiments, an approach to provide security to integrated circuit 100 is prompting a user with a password in order to log-into integrated circuit 100. For example, in some embodiments, integrated circuit 100 is logged into by a user during a log-in operation. In some embodiments, during the log-in operation, controller 104 is configured to provide a log-in screen to the user, the user then enters at least credentials or a password to log-into integrated circuit 100. In some embodiments, if the credentials or password are correct, the user is logged into integrated circuit 100. In some embodiments, if the credentials or password are not correct, the user is not logged into integrated circuit 100. As part of a security mechanism, in some embodiments, the user can attempt to log-into integrated circuit 100 a finite number of attempts or trials within a time period specified by a log-in timer. For example, in some embodiments, if the user incorrectly enters an incorrect password more than the finite number of times or trials within the period specified by the log-in timer, then the integrated circuit 100 will not provide the user an opportunity to enter a password again until after the log-in timer expires. However, some users may attempt to gain access to integrated circuit 100 by powering off or turning off integrated circuit 100 in attempting to reset the log-in timer.

In some embodiments, integrated circuit 100 is configured to provide an additional timer that is used as an additional security mechanism thereby providing extra protection of the contents of integrated circuit 100 compared to other approaches. For example, in some embodiments, the volatility of data stored in memory cell array 102 functions as an additional timer. After removing memory cell array 102 from power supply VDD, due to the volatility of memory cell array 102, as time passes, data stored in memory cell array 102 as logic 1's will eventually change from a logic 1 to a logic 0 as leakage current in memory cell array 102 is discharged from a higher voltage (e.g., supply voltage VDD) to a lower voltage (e.g., reference voltage VSS). In some embodiments, integrated circuit 100 is configured to use the amount of time for the logic state of memory cells in memory cell array 102 to change as a timer for one or more authentication operations or functions.

For example, in some embodiments, by controller 104 writing data to each memory cell in memory cell array 102 after integrated circuit 100 is successfully logged into, and then reading the data stored in memory cell array 102 after integrated circuit 100 is powered off and then subsequently powered on, memory cell array 102 is configured to function as the additional timer, and can be used by integrated circuit 100 and controller 104 to track the time duration since being powered off. Thus, integrated circuit 100 provides an additional timer that is used as an additional security mechanism thereby providing extra security/protection of the contents of integrated circuit 100 compared to other approaches.

In some embodiments, a user successfully logs into integrated circuit 100; afterwards, controller 104 is configured to write data to each memory cell in memory cell array 102 in response to integrated circuit 100 being successfully logged into. In some embodiments, integrated circuit 100 is powered off or turned off, and then is subsequently powered on or turned on by one or more users. In some embodiments, controller 104 is configured to read data from each memory cell in memory cell array 102 in response to integrated circuit 100 being powered on. In some embodiments, controller 104 is configured to determine whether to allow an authentication operation of integrated circuit 100 in response to reading data from each memory cell in memory cell array 102. In some embodiments, the authentication operation includes providing one or more log-in operation(s) to the user of integrated circuit 100 or 500. Other authentication operations or functions are within the scope of the present disclosure.

In some embodiments, controller 104 is configured to determine if data read from memory cell array 102 is equal to data written to memory cell array 102. In some embodiments, memory cell array 102 is configured as a timer and keeps track of a time since integrated circuit 100 was powered off, by comparing the data read from memory cell array 102 with the data written to memory cell array 102.

In some embodiments, if the data read from memory cell array 102 is the same as the data written to memory cell array 102, then the leakage current is insufficient to cause the data stored in memory cell array 102 to change logic states since being powered off, thus indicating an insufficient amount of time has elapsed since integrated circuit 100 was powered off. In some embodiments, if insufficient time has passed since integrated circuit 100 was powered off, then a first time T1 since powering off integrated circuit 100 is not greater than the log-in timer (e.g., a minimum time), and controller 104 does not allow the user an authentication operation (e.g., password attempt to log into integrated circuit 100).

In some embodiments, if the data read from memory cell array 102 is not the same as the data written to memory cell array 102, then the leakage current is sufficient to cause the data stored in memory cell array 102 to change logic states since being powered off, thus indicating a sufficient amount of time has elapsed since integrated circuit 100 was powered off. In some embodiments, if sufficient time has passed since integrated circuit 100 was powered off, then a first time T1 since powering off integrated circuit 100 is greater than the log-in timer (e.g., a minimum time), and controller 104 allows the user an authentication operation (e.g., password attempt to log into integrated circuit 100).

Figure 4:
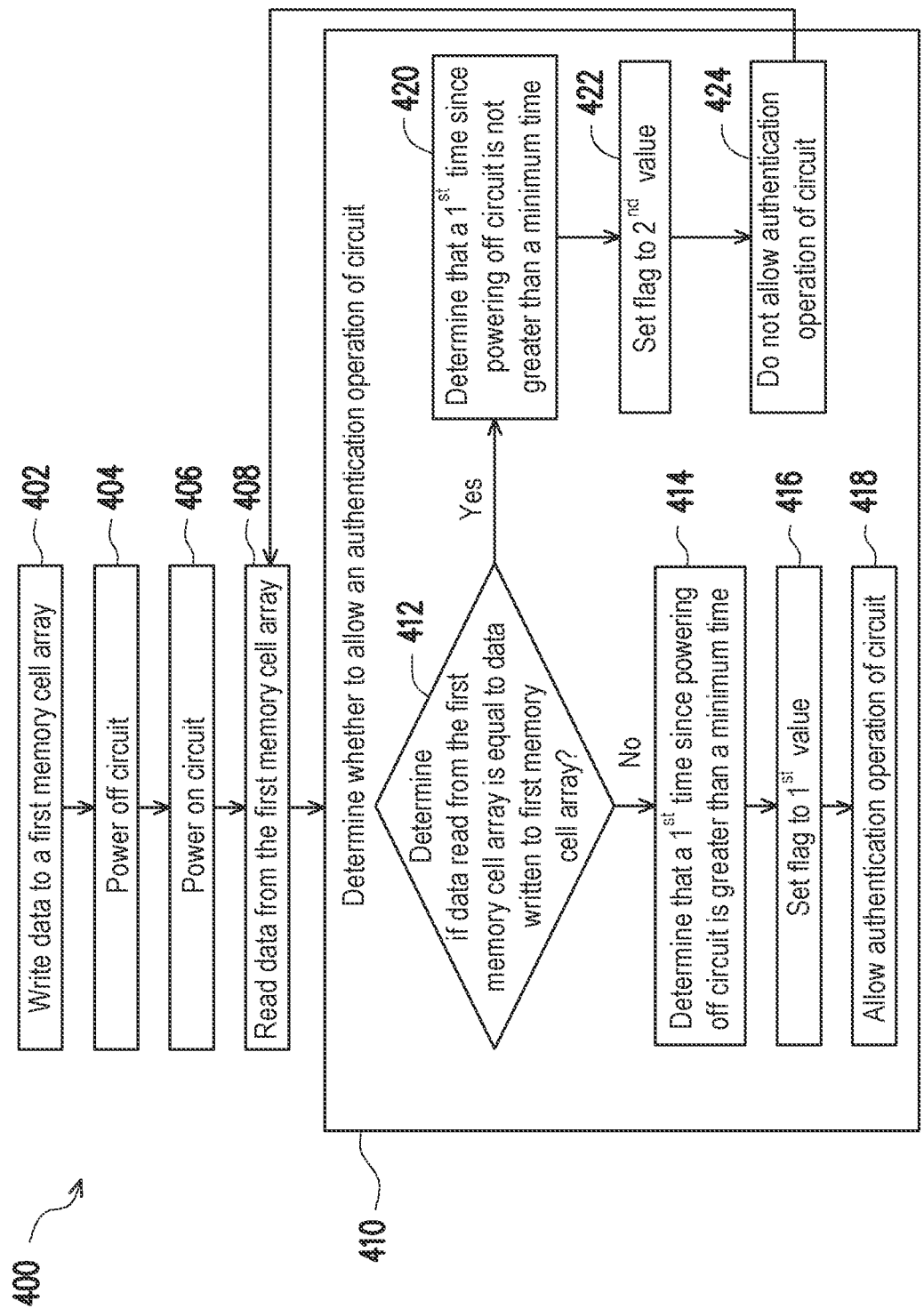
FIG. 4 is a flowchart of a method of operating an integrated circuit, in accordance with some embodiments.

Further details of one or more embodiments of the authentication process are further discussed in method 400 of FIG. 4.

In some embodiments, by integrated circuit 100 performing a write operation to memory cell array 102 in response to being initially powered on, and by performing a read operation of memory cell array 102 in response to being subsequently powered on, controller 104 is configured to provide one or more authentication operations to users of integrated circuit 100, thereby providing additional security/protection of the data contents of integrated circuit 100 compared to other approaches.

Other configurations of integrated circuit 100 are within the scope of the present disclosure.

Memory Cell Array

FIG. 2 is a circuit diagram of a memory circuit 200, in accordance with some embodiments.

Memory circuit 200 is an embodiment of memory cell array 102 of FIG. 1 or memory cell array 502 of FIG. 5 (described below), and similar detailed description is therefore omitted.

Components that are the same or similar to those in one or more of FIGS. 1-8 are given the same reference numbers, and detailed description thereof is thus omitted.

In the embodiment of FIG. 2, memory circuit 200 is a static random access memory (SRAM) circuit. SRAM is used for illustration, and other types of memories are within the scope of various embodiments. For example, in some embodiments, memory circuit 200 is a dynamic random access memory (DRAM) circuit. In some embodiments, memory circuit 200 is an embedded dynamic random access memory (eDRAM) circuit.

Memory circuit 200 comprises a memory cell array 202 having M rows and N columns of memory cells MCB, where N is a positive integer corresponding to the number of columns in memory cell array 202 and M is a positive integer corresponding to the number of rows in memory cell array 202. The rows of cells in memory cell array 202 are arranged in a first direction X. The columns of cells in memory cell array 202 are arranged in a second direction Y. The second direction Y is different from the first direction X. In some embodiments, the second direction Y is perpendicular to the first direction X.

In some embodiments, each memory cell MCB in memory cell array 202 is configured to store a bit of data. In some embodiments, memory circuit 200 is logic based memory.

The number of rows M in memory cell array 202 is equal to or greater than 1. The number of columns N in memory cell array 202 is equal to or greater than 1. In some embodiments, memory cell array 202 includes one or more single port (SP) SRAM cells. In some embodiments, memory cell array 202 includes one or more dual port (DP) SRAM cells. Different types of memory cells MCB in memory cell array 202 are within the contemplated scope of the present disclosure.

Memory circuit 200 further includes N bit lines BL[1], . . . BL[N] (collectively referred to as "bit line BL") and N bit line bars BLB[1], . . . BLB[N] (collectively referred to as "bit line bar BLB"). Each column 1, . . . , N in memory cell array 202 is overlapped and coupled to a corresponding bit line BL[1], . . . , BL[N] and a corresponding bit line bar BLB[1], . . . , BLB[N]. Each bit line BL or bit line bar BLB extends in the second direction Y and over a column of cells (e.g., column 1, . . . , N).

In some embodiments, the term "bar" indicates a logically inverted signal. In these embodiments, for example, bit line bar BLB[1], . . . BLB[N] carries a signal logically inverted from a signal carried by bit line BL[1], . . . BL[N].

Memory circuit 200 further includes M word lines WL[1], . . . WL[M] (collectively referred to as "word line WL"). Each row 1, . . . , M in memory cell array 202 is overlapped and coupled to a corresponding word line WL[1], . . . , WL[M]. Each word line WL extends in the first direction X and over a row of cells (e.g., row 1, . . . , M).

Other configurations of memory circuit 200 are within the scope of the present disclosure. In some embodiments, one or more of bit lines BL, bit line bars BLB or word lines WL are not included in memory circuit 200. In some embodiments, one or more of bit lines BL, bit line bars BLB or word lines WL are replaced with a corresponding source line SL.

Memory Cell

Figure 3:
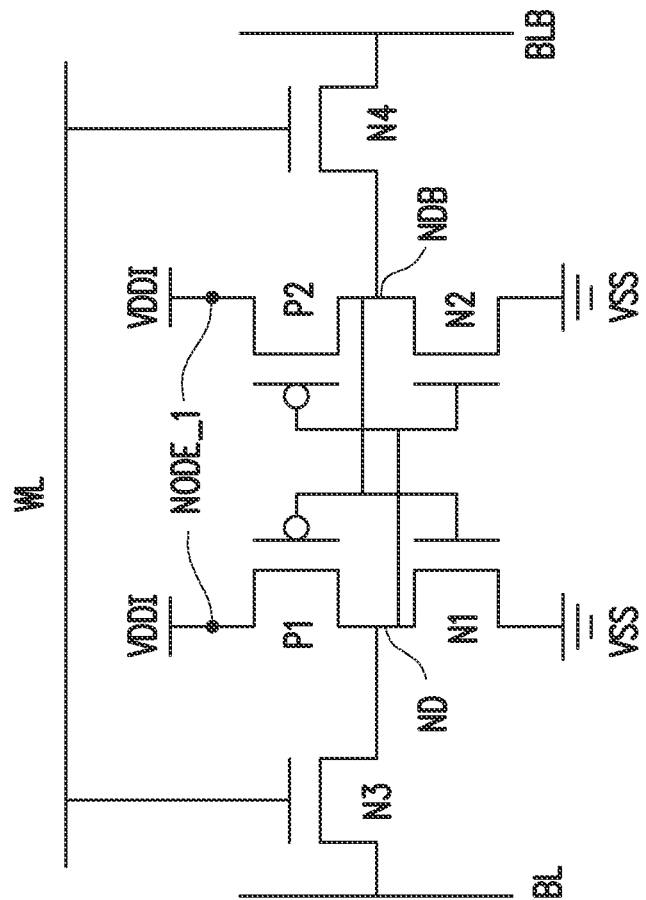
FIG. 3 is a circuit diagram of a memory cell, in accordance with some embodiments.

FIG. 3 is a circuit diagram of a memory cell 300 usable in FIG. 2, in accordance with some embodiments.

Memory cell 300 relates to memory circuit 200 of FIG. 2. Memory cell 300 is an embodiment of one or more memory cells MCB in memory cell array 202, and similar detailed description is omitted.

Memory cell 300 is a six transistor (6T) single port (SP) SRAM memory cell used for illustration. In some embodiments, memory cell 300 employs a number of transistors other than six. Other types of memory are within the scope of various embodiments. For example, in some embodiments, memory cell 300 is a DRAM memory cell or eDRAM memory cell.

Memory cell 300 comprises two P-type metal oxide semiconductor (PMOS) transistors P1 and P2, and four N-type metal oxide semiconductor (NMOS) transistors N1, N2, N3, and N4. Transistors P1, P2, N1, and N2 form a cross latch or a pair of cross-coupled inverters. For example, PMOS transistor P1 and NMOS transistor N1 form a first inverter while PMOS transistor P2 and NMOS transistor N2 form a second inverter.

A source terminal of each of PMOS transistors P1 and P2 are configured as a voltage supply node NODE_1. Each voltage supply node NODE_1 is coupled to a first voltage supply VDDI. Each of a drain terminal of PMOS transistor P1, a drain terminal of NMOS transistor N1, a gate terminal of PMOS transistor P2, a gate terminal of NMOS transistor N2, and a source terminal of NMOS transistor N3 are coupled together, and are configured as a storage node ND. Each of a drain terminal of PMOS transistor P2, a drain terminal of NMOS transistor N2, a gate terminal of PMOS transistor P1, a gate terminal of NMOS transistor N1, and a source terminal of NMOS transistor N4, are coupled together, and are configured as a storage node NDB.

A source terminal of each of NMOS transistors N1 and N2 is configured as a supply reference voltage node (not labelled) having a supply reference voltage VSS. The source terminal of each of NMOS transistors N1 and N2 is also coupled to supply reference voltage VSS.

A word line WL is coupled with a gate terminal of each of NMOS transistors N3 and N4. Word line WL is also called a write control line because NMOS transistors N3 and N4 are configured to be controlled by a signal on word line WL in order to transfer data between bit lines BL, BLB and corresponding nodes ND, NDB.

A drain terminal of NMOS transistor N3 is coupled to a bit line BL. A drain terminal of NMOS transistor N4 is coupled to a bit line BLB. Bit lines BL and BLB are configured as both data input and output for memory cell 300. In some embodiments, in a write operation, applying a logical value to bit line BL and the opposite logical value to bit line BLB enables writing the logical values on the bit lines to memory cell 300. Each of bit lines BL and BLB is called a data line because the data carried on bit lines BL and BLB are written to and read from corresponding nodes ND and NDB.

Word line WL corresponds to one or more word lines WL[1], WL[2], . . . , WL[M] in FIG. 2. Bit line BL corresponds to one or more bit lines BL[1], BL[2], . . . , BL[N] in FIG. 2. Bit line bar BLB corresponds to one or more bit line bars BLB[1], BLB[2], . . . , BLB[N] in FIG. 2.

Other configurations of memory cell 300 are within the scope of the present disclosure.

FIG. 4 is a flowchart of a method 400 of operating an integrated circuit, in accordance with some embodiments.

Figure 8:
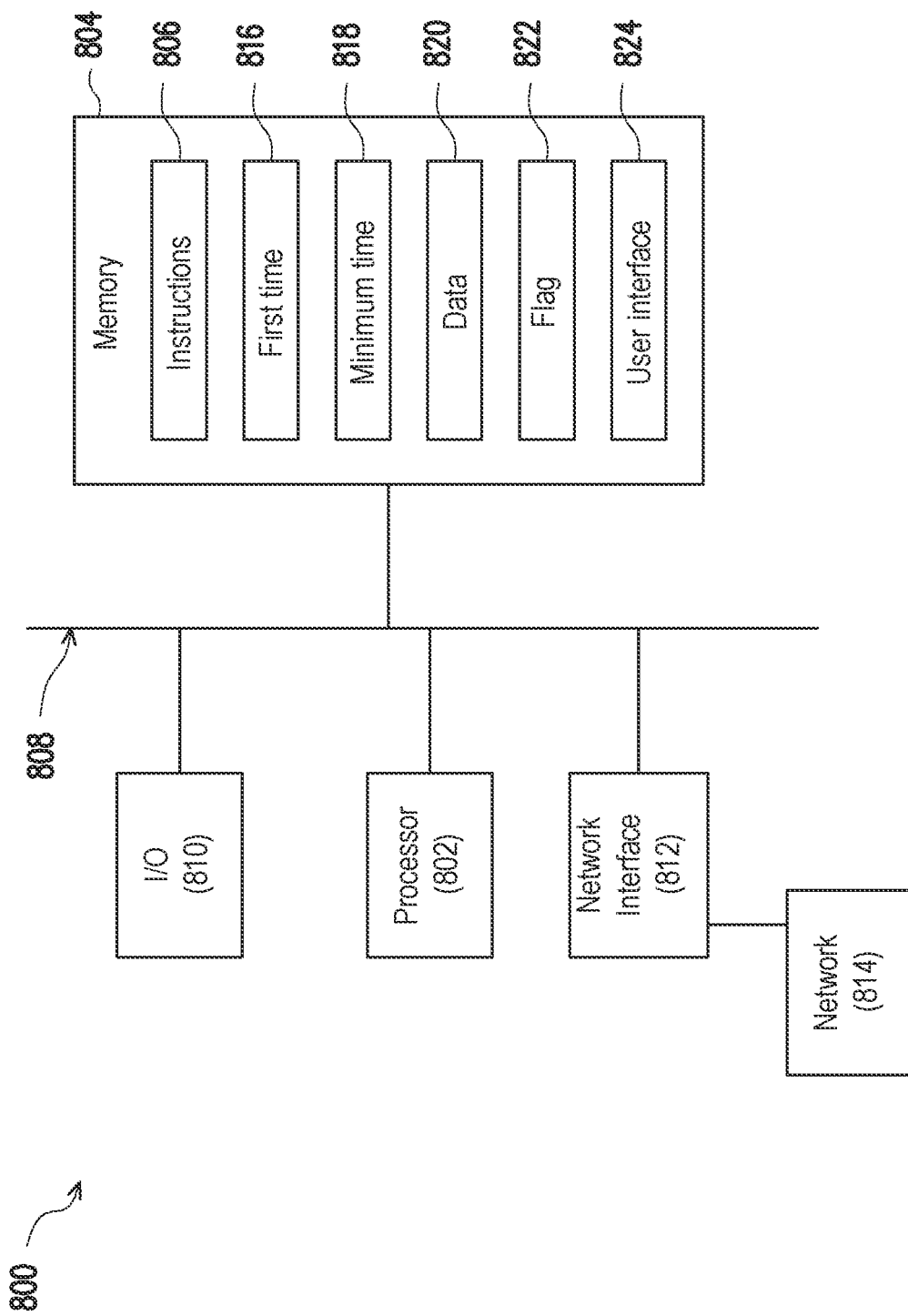
FIG. 8 is a schematic view of a system, in accordance with some embodiments.

In some embodiments, FIG. 4 is a flowchart of a method of operating integrated circuit 100, 700 or system 800 of corresponding FIG. 8. It is understood that additional operations may be performed before, during, and/or after the method 400 depicted in FIG. 4, and that some other operations may only be briefly described herein. In some embodiments, other order of operations of method 400 is within the scope of the present disclosure. In some embodiments, one or more operations of method 400 are not performed.

Method 400 includes exemplary operations, but the operations are not necessarily performed in the order shown. Operations may be added, replaced, changed order, and/or eliminated as appropriate, in accordance with the spirit and scope of disclosed embodiments. It is understood that method 400 utilizes features of one or more of integrated circuit 100 or 700, memory circuit 200, memory cell 300, or system 800.

In operation 402 of method 400, data is written to each memory cell in a first memory cell array. In some embodiments, the first memory cell array of method 400 includes at least memory cell array 102 or 202. In some embodiments, the first memory cell array of method 400 includes memory circuit 200. In some embodiments, the integrated circuit of method 400 includes at least integrated circuit 100 or 700 or system 800.

In some embodiments, the same data (e.g., logic "0" or "1") is written to each memory cell in the first memory cell array. In some embodiments, operation 402 includes writing a logic 1 to each memory cell in the first memory cell array. In some embodiments, operation 402 is performed by controller 104. In some embodiments, operation 402 is performed by at least a write driver circuit in X-decoder circuit 106. In some embodiments, each memory cell in the first memory cell array of method 400 includes at least memory cell MCB in FIG. 2 or memory cell 300 in FIG. 3.

In some embodiments, data is written to each memory cell in the first memory cell array in response to powering on or turning on the integrated circuit. In some embodiments, data is written to each memory cell in the first memory cell array in response to a user successfully logging into the integrated circuit. In some embodiments, operation 402 is performed in response to other operations of the integrated circuit.

In some embodiments, operation 402 includes writing a logical high to memory cell 300. In some embodiments, operation 402 includes turning on NMOS transistors N3 and N4 in response to a word line signal on word line WL, providing a logical high as the voltage on the bit line BL or bit line bar BLB, and then turning off NMOS transistors N3 and N4 in response to a word line signal on word line WL.

In operation 404 of method 400, the integrated circuit is powered off or turned off. In some embodiments, operation 404 is performed by a user.

In some embodiments, powering off or turning off the integrated circuit of method 400 or 600 includes disconnecting the integrated circuit from a power source or a supply voltage. In some embodiments, powering off or turning off the integrated circuit of method 400 or 600 includes removing a battery from the integrated circuit. In some embodiments, powering off or turning off the integrated circuit of method 400 or 600 includes removing a capacitor from the integrated circuit.

In operation 406 of method 400, the integrated circuit is powered on or turned on. In some embodiments, operation 406 is performed by a user.

In some embodiments, powering on or turning on the integrated circuit of method 400 or 600 includes connecting the integrated circuit to a power source or a supply voltage. In some embodiments, powering on or turning on the integrated circuit of method 400 or 600 includes connecting a battery to the integrated circuit. In some embodiments, powering on or turning on the integrated circuit of method 400 or 600 includes connecting a capacitor to the integrated circuit.

In operation 408 of method 400, data is read from each memory cell in the first memory cell array in response to powering on the integrated circuit.

In some embodiments, operation 408 is performed by controller 104. In some embodiments, operation 408 is performed by at least a sense amplifier circuit in read circuit 110.

In some embodiments, operation 408 includes pre-charging bit line BL and bit line bar BLB to a pre-charge voltage VBL, turning on NMOS transistors N3 and N4 in response to a word line signal on word line WL, turning on a sense amplifier circuit in response to a sense amplifier enable signal, and latching the data stored in memory cell 300. In some embodiments, pre-charge voltage VBL is equal to supply voltage VDD. In some embodiments, pre-charge voltage VBL is equal to supply reference voltage VSS. In some embodiments, pre-charge voltage VBL is between supply voltage VDD and reference voltage VSS.

In operation 410 of method 400, a determination is made whether to allow an authentication operation of the integrated circuit in response to reading data from each memory cell in the first memory cell array. In some embodiments, operation 410 is performed by controller 104. In some embodiments, operation 410 is performed by a processor, such as processor 802 of FIG. 8.

In some embodiments, operation 410 includes at least operation 412, 414, 416, 418, 420, 422 or 424.

In operation 412 of method 400, a determination is made if data read from at least one memory cell in the first memory cell array is not equal to data written to the at least one memory cell in the first memory cell array.

In some embodiments, operation 412 is performed by controller 104. In some embodiments, operation 412 is performed by a processor, such as processor 802 in system 800 of FIG. 8.

In some embodiments, if the data read from at least one memory cell in the first memory cell array is not equal to data written to the at least one corresponding memory cell in the first memory cell array, then the leakage current is sufficient to cause the data stored in first memory cell array to change logic states since being powered off, thus indicating a sufficient amount of time has elapsed since integrated circuit 100 was powered off, and the result of operation 412 is a "no", and method 400 proceeds to operation 414.

In some embodiments, if the data read from at least one memory cell in the first memory cell array is equal to data written to the at least one corresponding memory cell in the first memory cell array, then the leakage current is insufficient to cause the data stored in at least one memory cell in the first memory cell array to change logic states since being powered off, thus indicating an insufficient amount of time has elapsed since integrated circuit 100 was powered off, and the result of operation 412 is a "yes", and method 400 proceeds to operation 420.

In operation 414 of method 400, a determination is made that a first time T1 since powering off the integrated circuit is greater than a minimum time of the log-in timer. In some embodiments, operation 414 indicates that a sufficient amount of time (e.g., first time T1) has elapsed since integrated circuit 100 was powered off, and the amount of time (e.g., first time T1) is thus greater than the minimum time of the log-in timer.

In some embodiments, operation 414 is performed by controller 104. In some embodiments, operation 414 is performed by a processor, such as processor 802 in system 800 of FIG. 8.

In some embodiments, operation 414 includes controller 104 determining that a sufficient amount of time has passed since integrated circuit 100 was powered off, thereby determining that the first time T1 since powering off the integrated circuit is effectively greater than the minimum time of the log-in timer.

In operation 416 of method 400, a flag is set to a first value in response to determining that the first time T1 since powering off the integrated circuit is greater than the minimum time. In some embodiments, the flag corresponds to a single bit of data. In some embodiments, the flag corresponds to a more than a single bit of data. In some embodiments, the first value is equal to a logic 1. In some embodiments, the first value is equal to a logic 0.

In some embodiments, operation 416 is performed by controller 104. In some embodiments, operation 416 is performed by a processor, such as processor 802 in system 800 of FIG. 8.

In operation 418 of method 400, an authentication operation of the integrated circuit is allowed or performed in response to the flag being the first value.

In some embodiments, operation 418 is performed by controller 104 or system 800. In some embodiments, operation 418 is performed by a processor, such as processor 802 in system 800 of FIG. 8.

In some embodiments, operation 418 includes prompting the user with a password authentication or logging in operation(s). In some embodiments, operation 418 includes enabling the password authentication or logging in operation for the user such that system 800 prompts the user with the password authentication or logging in operation(s). In some embodiments, the authentication operation includes providing the user an attempt to log into integrated circuit 100 by prompting the user for a password.

In operation 420 of method 400, a determination is made that the first time T1 since powering off the integrated circuit is not greater than the minimum time of the log-in timer. In some embodiments, operation 420 indicates that an insufficient amount of time (e.g., first time T1) has elapsed since integrated circuit 100 was powered off, and the amount of time (e.g., first time T1) is thus not greater than the minimum time of the log-in timer.

In some embodiments, operation 420 is performed by controller 104. In some embodiments, operation 420 is performed by a processor, such as processor 802 in system 800 of FIG. 8.

In some embodiments, operation 420 includes controller 104 determining that an insufficient amount of time has passed since integrated circuit 100 was powered off, thereby determining that the first time T1 since powering off the integrated circuit is effectively not greater than the minimum time of the log-in timer.

In operation 422 of method 400, a flag is set to a second value in response to determining that the first time T1 since powering off the integrated circuit is not greater than the minimum time. In some embodiments, the second value is different from the first value. In some embodiments, the first value is equal to a logic 1, and the second value is a logic 0. In some embodiments, the first value is equal to a logic 0, and the second value is a logic 1.

In some embodiments, operation 422 is performed by controller 104. In some embodiments, operation 422 is performed by a processor, such as processor 802 in system 800 of FIG. 8.

In operation 424 of method 400, an authentication operation of the integrated circuit is not allowed or not performed in response to the flag being the second value.

In some embodiments, operation 424 is performed by controller 104 or system 800. In some embodiments, operation 424 is performed by a processor, such as processor 802 in system 800 of FIG. 8.

In some embodiments, operation 424 includes not prompting the user with the password authentication or logging in operation(s). In some embodiments, operation 424 includes disabling the password authentication or logging in operation for the user such that system 800 does not prompt the user with the password authentication or logging in operation(s).

In some embodiments, after operation 424, method 400 proceeds to operation 408 to perform additional read operations of the first memory cell array. In some embodiments, the additional read operations are performed in operation 408 to determine if at least one memory cell in the first memory cell array changes logic states thereby allowing the user to proceed to the authentication operation of operation 418. In other words, after operation 424, method 400 proceeds to operation 408 to perform additional read operations of the first memory cell array until a sufficient amount of time (e.g., first time T1) has elapsed since integrated circuit 100 was powered off, thereby allowing the user to proceed to the authentication operation of operation 418. In some embodiments, after operation 424, method 400 remains in an idle state until the log-in timer expires.

By operating method 400, the integrated circuit operates to achieve the benefits discussed above with respect to integrated circuit 100. While method 400 was described above with reference to FIGS. 1, 2 and 3, it is understood that method 400 utilizes the features of one or more of FIGS. 7-8. In some embodiments, method 400 was described above with reference to SRAM, but is applicable to DRAM or eDRAM as well, and similar detailed description is omitted.

Figure 5:
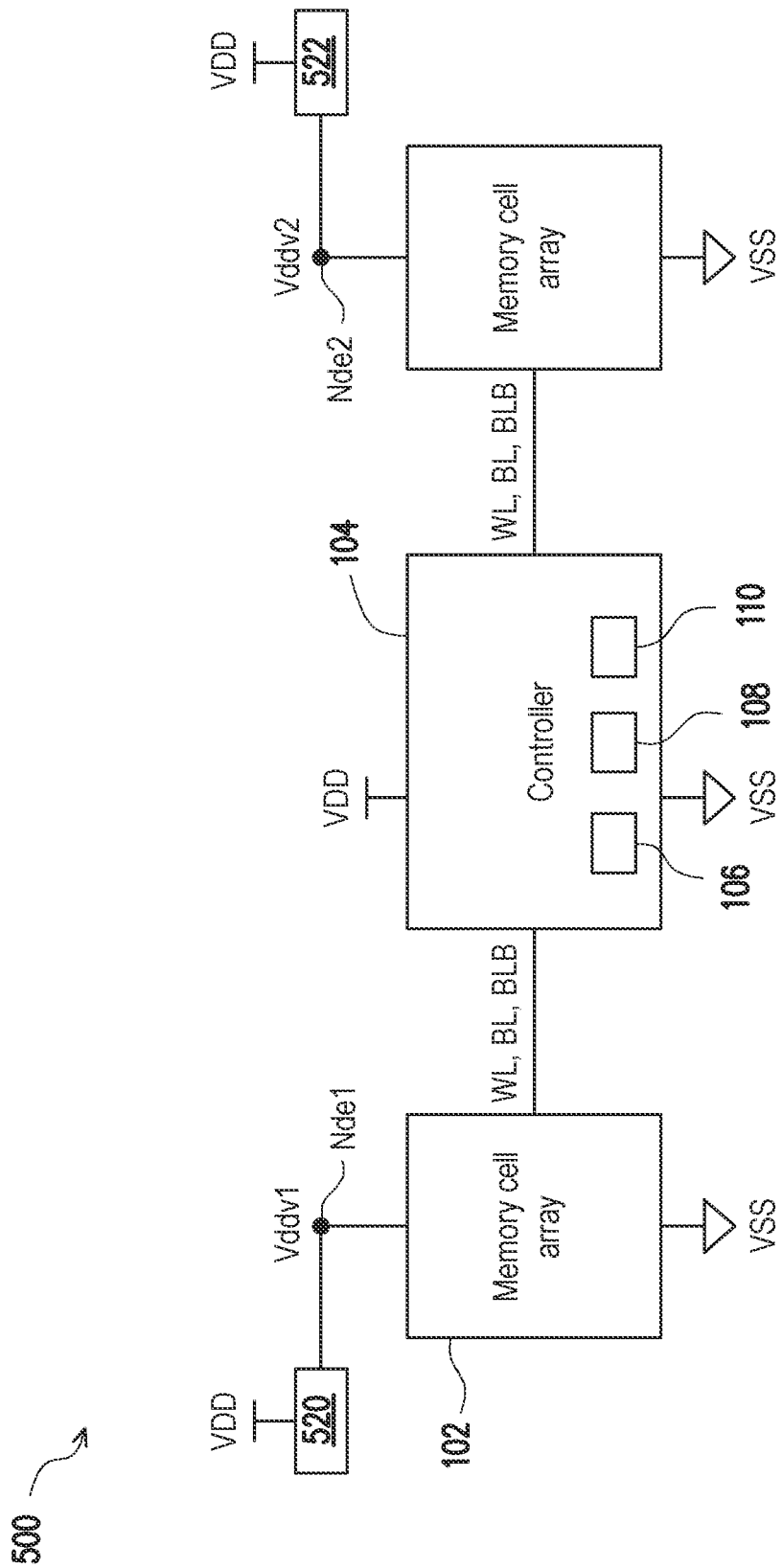
FIG. 5 is a block diagram of an integrated circuit, in accordance with some embodiments.

FIG. 5 is a block diagram of an integrated circuit 500, in accordance with some embodiments. In the embodiment of FIG. 5, integrated circuit 500 is a memory macro.

Integrated circuit 500 is a variation of integrated circuit 100 of FIG. 1, and similar detailed description is therefore omitted. In comparison with integrated circuit 100 of FIG. 1, integrated circuit 500 further includes memory cell array 502, power supply 520 and power supply 522. In some embodiments, memory cell array 502 has a size that is different from memory cell array 102 of FIG. 1.

By further including memory cell array 502, integrated circuit 500 includes two memory cell arrays (memory cell array 102 and 502) that are configured to have different corresponding data retention times, thus effectively having different corresponding timers thereby providing further security/protection of the contents of integrated circuit 500 compared to other approaches, over a range of different temperature regions.

Memory cell arrays 102 and 502 are configured to have different corresponding data retention times. By memory cell arrays 102 and 502 having different array sizes or being coupled to different corresponding power supplies 520 and 522 with different corresponding capacitances, memory cell arrays 102 and 502 have different corresponding data retention times. In some embodiments, by adjusting the size of memory cell arrays 102 and 502 or adjusting the capacitance (e.g., capacitance C1 in FIG. 7) of power supplies 520 and 522, the data retention times of memory cell arrays 102 and 502 is also adjusted thereby adjusting the corresponding timer.

In some embodiments, memory cell arrays 102 and 502 are configured to have different corresponding leakage currents that discharge at different speeds, thereby having different corresponding data retention times over a range of different temperature regions.

In some embodiments, memory cell arrays 102 and 502 are coupled to different corresponding power supplies 520 and 522 that are configured to have different corresponding capacitances, thereby causing corresponding memory cell arrays 102 and 502 to have different corresponding data retention times over a range of different temperature regions.

Integrated circuit 500 includes memory cell array 102, controller 104, memory cell array 502, power supply 520 and power supply 522. In some embodiments, memory cell array 502 is similar to memory cell array 102, and similar detailed description is therefore omitted. In some embodiments, memory cell array 202 is an embodiment of memory cell array 502, and similar detailed description is therefore omitted.

In comparison with memory cell array 102 in FIG. 1, memory cell array 102 in FIG. 5 is coupled to power supply 520. Power supply 520 is configured to provide supply voltage Vddv1 to node Nde1 of memory cell array 102. Node Nde1 corresponds to node NODE_1 in FIG. 3, and similar detailed description is omitted. In some embodiments, supply voltage Vddv1 is equal to supply voltage VDD. In some embodiments, by adjusting a capacitance (e.g., capacitance C1 in FIG. 7) of power supply 520 thereby adjusts the data retention time of memory cell array 102.

Memory cell array 502 is coupled to controller 104. In some embodiments, memory cell array 502 is coupled to controller 104 by at least bit lines BL, bit line bars BLB, word lines WL or other conductive lines. Controller 104 is configured to control memory cell array 502. In some embodiments, controller 104 is configured to provide one or more security measures (described below) to integrated circuit 500. Memory cell array 502 is further coupled to reference supply voltage VSS and power supply 522. Power supply 522 is configured to provide supply voltage Vddv2 to memory cell array 502. In some embodiments, at least supply voltage VDD, Vddv1 or Vddv2 is equal to another of at least supply voltage VDD, Vddv1 or Vddv2. In some embodiments, at least supply voltage VDD, Vddv1 or Vddv2 is different from another of at least supply voltage VDD, Vddv1 or Vddv2. In some embodiments, by adjusting a capacitance (e.g., capacitance C1 in FIG. 7) of power supply 522 thereby adjusts the data retention time of memory cell array 502.

In some embodiments, memory cell array 502 is a volatile memory cell array. In some embodiments, memory cell array 502 includes an array of volatile memory cells that are configured to lose the stored data within due to leakage current. In some embodiments, each memory cell in memory cell array 502 corresponds to an SRAM cell. In some embodiments, each memory cell in memory cell array 502 corresponds to a DRAM cell. In some embodiments, each memory cell in memory cell array 102 corresponds to an eDRAM cell. Other types of memory cells in memory cell array 502 are within the contemplated scope of the present disclosure.

In some embodiments, each memory cell in memory cell array 502 is configured to store 1 bit of data. In some embodiments, each memory cell in memory cell array 502 is configured to store more than a 1 bit of data.

Memory cell array 502 comprises an array of memory cells having X rows and Y columns, where X and Y are positive integers (shown in FIG. 2). In some embodiments, at least rows X or columns Y is different from at least corresponding rows M or columns N.

The retention time of the memory cell array is inversely related to the size of the memory cell array. A size of the memory cell array is directly related to the speed of the leakage current of the memory cell array and is inversely related to the retention time of the memory cell array. Stated differently, the speed of the leakage current is based on the size of the memory cell array.

For example, a larger memory cell array (with more cells) has a larger leakage current, and therefore a faster bit flip time than a smaller memory cell (with less cells). Thus, data stored in the larger memory cell array (with more cells) will discharge faster than the smaller memory cell, and the larger memory cell array will retain data for a shorter time than data stored in the smaller memory cell.

Furthermore, a smaller memory cell array (with less cells) has a smaller leakage current, and therefore a slower bit flip time than a larger memory cell (with more cells). Thus, data stored in the smaller memory cell array (with less cells) will discharge slower than the larger memory cell, and the smaller memory cell array will retain data for a longer time than data stored in the larger memory cell.

In some embodiments, in comparison with memory cell array 102, memory cell array 502 has a different array size. For example, in some embodiments, if memory cell array 102 has N columns or M rows, then memory cell array 502 has at least a number of columns different from N or a number of rows different from M, where M and N are positive integers.

Memory cell array 102 has a first array size and a first leakage path. The first leakage path has a first leakage current.

Memory cell array 502 has a second array size and a second leakage path. The second leakage path has a second leakage current. In some embodiments, the first leakage path is less than the second leakage path. In some embodiments, the first leakage current is less than the second leakage current.

In some embodiments, the second array size of memory cell array 502 is greater than the first array size of memory cell array 102, and therefore the second leakage current of the second path of memory cell array 502 is greater than the first leakage current of the first path of memory cell array 102. Thus, in some embodiments, data stored in memory cell array 502 will discharge faster than data stored in memory cell array 102. Stated differently, in some embodiments, memory cell array 102 will retain data for a duration of time greater than data retained by memory cell array 502.

In some embodiments, the second array size of memory cell array 502 is not greater than the first array size of memory cell array 102. In some embodiments, the second array size of memory cell array 502 is equal to the first array size of memory cell array 102.

The retention time of the memory cell array is directly related to the capacitance of the power supply (e.g., power supply 520 or 522) provided to the memory cell array. Stated differently, the retention time of the memory cell array is based on the capacitance of the power supply provided to the memory cell array.

For example, a memory cell array coupled to a power supply (e.g., power supply 520) having a larger capacitance, therefore has a larger retention time and a slower bit flip time. Thus, data stored in a memory cell array coupled to a power supply (e.g., power supply 520) having a larger capacitance will discharge slower and retain data for a longer time than data stored in a memory cell coupled to a power supply (e.g., power supply 522) having a lower capacitance.

Furthermore, a memory cell array coupled to a power supply (e.g., power supply 522) having a smaller capacitance, therefore has a smaller retention time and a faster bit flip time. Thus, data stored in a memory cell array coupled to a power supply (e.g., power supply 522) having a smaller capacitance will discharge faster and retain data for a smaller time than data stored in a memory cell coupled to a power supply (e.g., power supply 520) having a larger capacitance.

Memory cell array 102 is coupled to power supply 520 having a first capacitance. Power supply 520 is coupled to supply voltage VDD, and is configured to provide supply voltage Vddv1 to node Nde1. Memory cell array 502 is coupled to power supply 522 having a second capacitance. Power supply 522 is coupled to supply voltage VDD, and is configured to provide supply voltage Vddv2 to node Nde2.

In some embodiments, the first capacitance of power supply 520 is greater than the second capacitance of power supply 522, thereby causing data stored in memory cell array 102 to discharge slower than data stored in memory cell array 502. In some embodiments, by the data stored in memory cell array 102 discharging slower than data stored in memory cell array 502, the data stored in memory cell array 102 is retained for a longer time than data stored in memory cell array 502. Thus, in some embodiments, memory cell array 102 will retain data for a duration of time greater than data retained by memory cell array 502.

In some embodiments, by memory cell arrays 102 and 502 having different array sizes or being coupled to different corresponding power supplies 520 and 522 with different corresponding capacitances, memory cell arrays 102 and 502 have different corresponding data retention times. In some embodiments, the different data retention times of memory cell arrays 102 and 502 can be used as different corresponding timers (e.g., first time T1 in method 600) thereby providing further security/protection of the contents of integrated circuit 500 compared to other approaches, over a range of different temperature regions.

Integrated circuit 500 is configured to operate over a range of different temperatures. For example, in some embodiments, as the temperature of integrated circuit 500 increases, the leakage current or discharge rate of data stored in memory cell arrays 102 and 502 also increases thereby reducing the retention time of data stored in memory cell arrays 102 and 502. For example, in some embodiments, as the temperature of integrated circuit 500 decreases, the leakage current or discharge rate of data stored in memory cell arrays 102 and 502 also decreases thereby increasing the retention time of data stored in memory cell arrays 102 and 502.

A user may attempt to change the temperature of integrated circuit 500 in order to gain access to integrated circuit 500 thereby attempting to bypass security measures provided by integrated circuit 100 or 500. For example, the user may heat up integrated circuit 500, thereby increasing the temperature of integrated circuit 500 to accelerate the leakage current or reduce the retention time of data stored in memory cell array 102 or 502. By accelerating the leakage current or reducing the retention time of data stored in memory cell array 102 or 502, the user is attempting to advance the first time T1 (e.g., method 400 or 600) to be greater than the log-in timer (e.g., a minimum time), and thereby attempting to gain unauthorized access to integrated circuit 100 or 500.

However, since integrated circuit 500 includes memory cell arrays (e.g., memory cell arrays 102 and 502) with different data retention times, integrated circuit 500 is able to overcome attempts by user(s) to change the temperature of integrated circuit 500 in order to gain unauthorized access to integrated circuit 500.

For example, in some embodiments, memory cell array 102 and memory cell array 502 are configured to lose data retention at two different temperature regions (e.g., first temperature region T1 and second temperature region T2), thus temperature changes by user(s) 500 to accelerate the leakage current or reduce the retention time of data stored in one of memory cell array 102 or 502 is not successful to accelerate the leakage current in both memory cell arrays 102 or 502.

Memory cell array 102 is configured to have memory cells that lose data retention at a first temperature region Temp1 after a duration of time (e.g., first time T1). In some embodiments, in comparison with memory cell array 502, memory cell array 102 is configured to have a first leakage path (e.g., smaller) having a first leakage current (e.g., smaller), and memory cells in memory cell array 102 are configured to lose data retention at a first temperature region Temp1 (e.g., higher temperature) after a duration of time (e.g., first time T1). Stated differently, in some embodiments, memory cell array 102 is configured or designed to discharge at a higher temperature by the low (e.g., slow) leakage path after a duration of the first time T1.

Memory cell array 502 is configured to have memory cells that lose data retention at a second temperature region Temp2 after a duration of time (e.g., first time T1). In some embodiments, in comparison with memory cell array 102, memory cell array 502 is configured to have a second leakage path (e.g., larger) having a second leakage current (e.g., larger), and memory cells in memory cell array 502 are configured to lose data retention at a second temperature region Temp2 (e.g., lower temperature) after a duration of time (e.g., first time T1). Stated differently, in some embodiments, memory cell array 502 is configured or designed to discharge at a lower temperature by the fast (e.g., faster) leakage path after a duration of the first time T1.

In some embodiments, the first temperature region Temp1 is greater than the second temperature region Temp2, and therefore memory cell array 102 is configured to have memory cells that lose data retention at the first temperature region Temp1 (e.g., higher temperature) after a duration of time (e.g., first time T1), and memory cell array 502 is configured to have memory cells that lose data retention at the second temperature region Temp2 (e.g., lower temperature) after a duration of time (e.g., first time T1).

In some embodiments, by having an additional memory cell array (e.g., memory cell array 102) configured to discharge at a higher temperature and a different rate than memory cell array 502, prevents a user from heating integrated circuit 500 to accelerate the timer (e.g., first time T1). For example, in some embodiments, integrated circuit 500 is designed such that memory cell array 102 is configured to discharge at a slower rate (e.g., retain data longer) at the heated up temperature (e.g., first temperature region Temp1) after a duration of time T1 than memory cell array 502. Thus, if integrated circuit 500 is heated up by a user, the faster discharging memory cells of memory cell array 502 will have already discharged, but the slower discharging memory cells of memory cell array 102 will not have discharged until the timer expires (e.g., first time T1.) Thus, attempts by a user to heat up integrated circuit 500 to advance the timer are thwarted, and integrated circuit 500 prevents the user from gaining access.

In some embodiments, by having an additional memory cell array (e.g., memory cell array 502) configured to discharge at a lower temperature and a different rate than memory cell array 102, prevents integrated circuit 500 from having an excessively long log in timer. For example, if memory cell array 102 with the slower discharge times is used at temperatures (e.g., second temperature Temp2) less than the first temperature Temp1, then memory cell array 102 would not discharge until well beyond the timer (e.g., first time T1) which would result in an excessively long log in timer. Therefore, by integrated circuit 500 having the additional memory cell (e.g., memory cell array 502) with the faster discharge times at temperatures (e.g., second temperature Temp2) less than the first temperature Temp1, thereby prevents integrated circuit 500 from having an excessively long log in timer.

In some embodiments, the first temperature region Temp1 is less than the second temperature region Temp2.

In some embodiments, during operation of integrated circuit 500, a user successfully logs into integrated circuit 500; afterwards, controller 104 is configured to write data to each memory cell in memory cell array 102 and 502 in response to integrated circuit 500 being successfully logged into. In some embodiments, integrated circuit 500 is powered off or turned off, and then is subsequently powered on or turned on by one or more users. In some embodiments, controller 104 is configured to read data from each memory cell in memory cell array 102 and 502 in response to integrated circuit 500 being powered on. In some embodiments, controller 104 is configured to determine whether to allow an authentication operation of integrated circuit 500 in response to reading data from each memory cell in memory cell array 102 and 502. In some embodiments, the authentication operation includes providing one or more log-in operation(s) to the user of integrated circuit 100 or 500. Other authentication operations or functions are within the scope of the present disclosure.

In some embodiments, controller 104 is configured to determine if data read from memory cell array 102 is equal to data written to memory cell array 102, and controller 104 is configured to determine if data read from memory cell array 502 is equal to data written to memory cell array 502. In some embodiments, memory cell array 102 or 502 is configured as a timer and keeps track of a time since integrated circuit 500 was powered off, by comparing the data read from memory cell array 102 with the data written to memory cell array 102 or by comparing the data read from memory cell array 502 with the data written to memory cell array 502.

For example, in some embodiments, if the temperature of integrated circuit 500 is increased to be equal to or greater than second temperature region Temp2, controller 104 will determine that memory cells in memory cell array 502 have lost data retention in response to reading memory cell array 502, and controller 104 will determine whether memory cells in memory cell array 102 have lost data retention in response to reading memory cell array 102. In these embodiments, if memory cells in memory cell array 102 have lost data retention in response to reading memory cell array 102, then controller 104 determines a sufficient amount of time has elapsed since integrated circuit 500 was powered off, and the first time T1 since powering off integrated circuit 500 is greater than the log-in timer (e.g., a minimum time), and controller 104 allows the user an authentication operation (e.g., password attempt to log into integrated circuit 500). In these embodiments, if memory cells in memory cell array 102 have not lost data retention in response to reading memory cell array 102, then controller 104 waits until memory cells in memory cell array 102 have lost data retention in response to performing another read operation of memory cell array 102. In these embodiments, if memory cells in memory cell array 102 have lost data retention in response to the another read operation of memory cell array 102, then controller 104 determines a sufficient amount of time has elapsed since integrated circuit 500 was powered off, and the first time T1 since powering off integrated circuit 500 is greater than the log-in timer (e.g., a minimum time), and controller 104 allows the user an authentication operation (e.g., password attempt to log into integrated circuit 500).

For example, in some embodiments, if the temperature of integrated circuit 500 is less than the second temperature region Temp2, controller 104 will determine whether memory cells in memory cell array 502 have lost data retention in response to reading memory cell array 502, and controller 104 will determine whether memory cells in memory cell array 102 have lost data retention in response to reading memory cell array 102. In these embodiments, if memory cells in memory cell array 502 have not lost data retention in response to reading memory cell array 502, then controller 104 waits until memory cells in memory cell array 502 have lost data retention in response to performing another read operation of memory cell array 502. In these embodiments, if memory cells in memory cell array 502 have lost data retention in response to the another read operation of memory cell array 502, then controller 104 determines a sufficient amount of time has elapsed since integrated circuit 500 was powered off, and the first time T1 since powering off integrated circuit 500 is greater than the log-in timer (e.g., a minimum time), and controller 104 allows the user an authentication operation (e.g., password attempt to log into integrated circuit 500). In these embodiments, if memory cells in memory cell array 502 have lost data retention in response to reading memory cell array 502, then controller 104 will determine whether memory cells in memory cell array 102 have lost data retention in response to reading memory cell array 102 similar to that described above, and similar detailed description is omitted.

Other configurations of at least memory cell array 102 or 502 are within the scope of the present disclosure. Other numbers of at least memory cell array 102 or 502 with different corresponding sizes are within the scope of the present disclosure.

Other configurations of at least power circuit 520 or 522 are within the scope of the present disclosure. Other capacitance values of at least power circuit 520 or 522 are within the scope of the present disclosure.

Figure 6A:
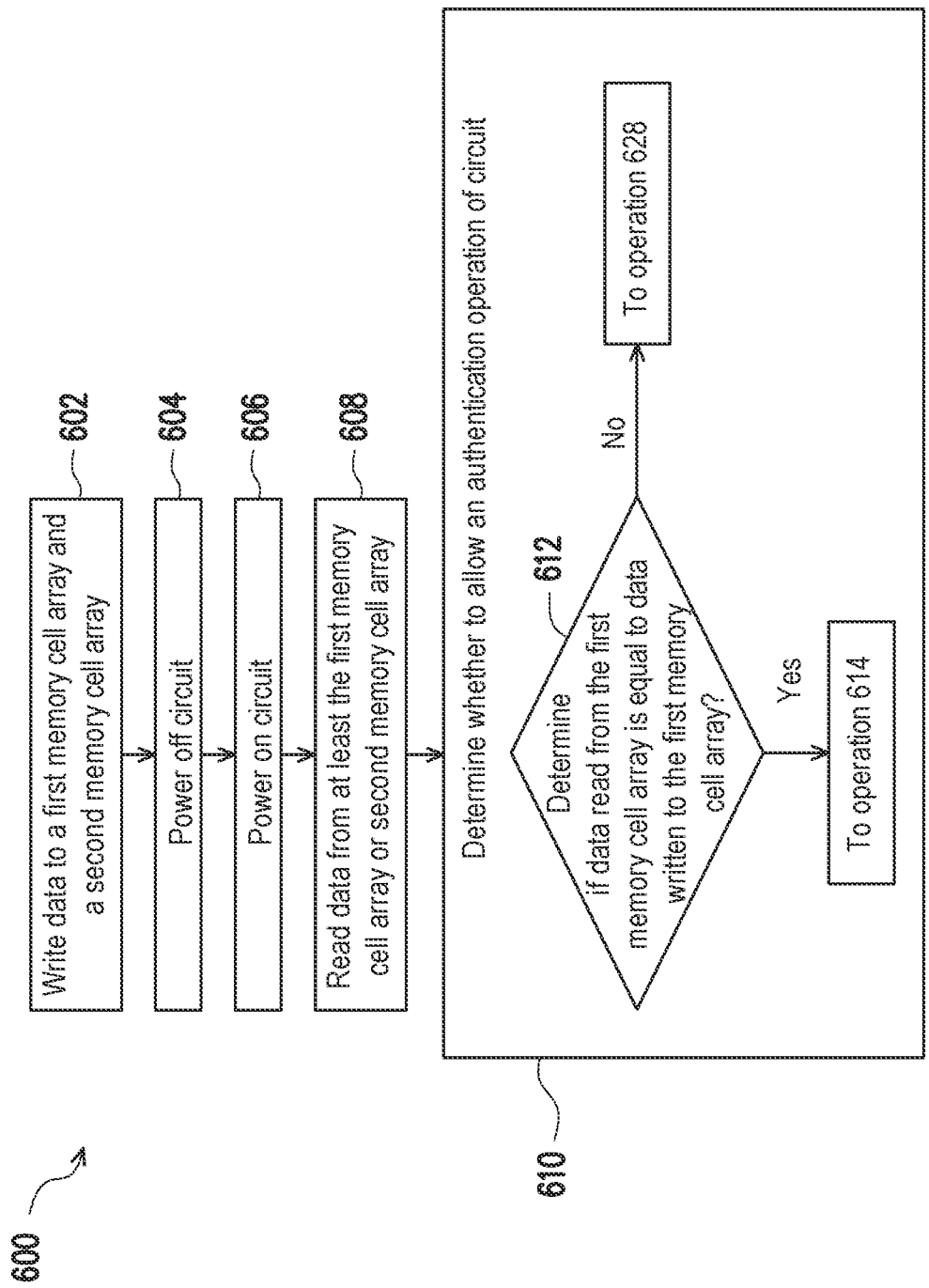
FIGS. 6A-6C are a flowchart of a method of operating an integrated circuit, in accordance with some embodiments.
Figure 6B:
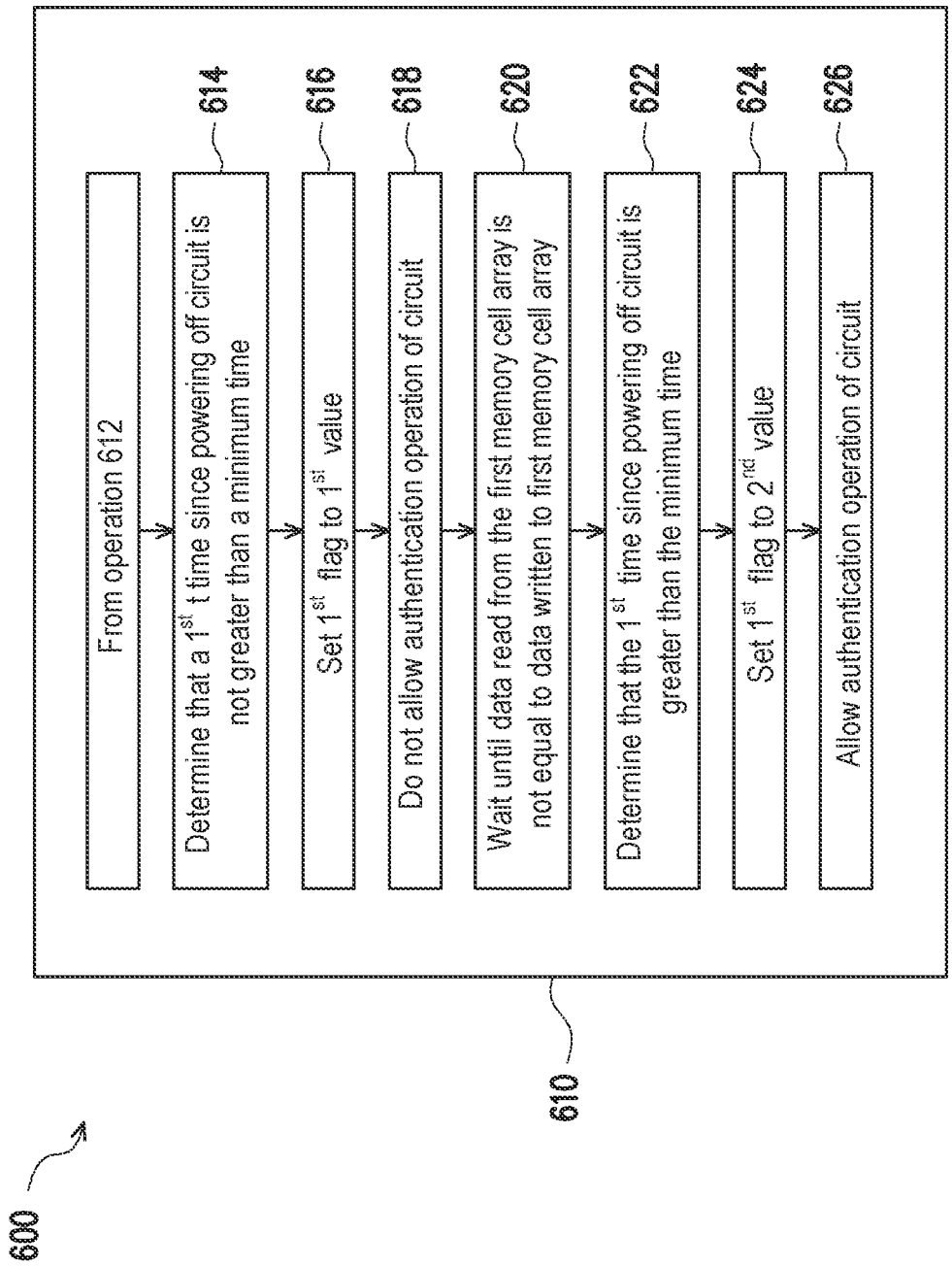
Figure 6C:
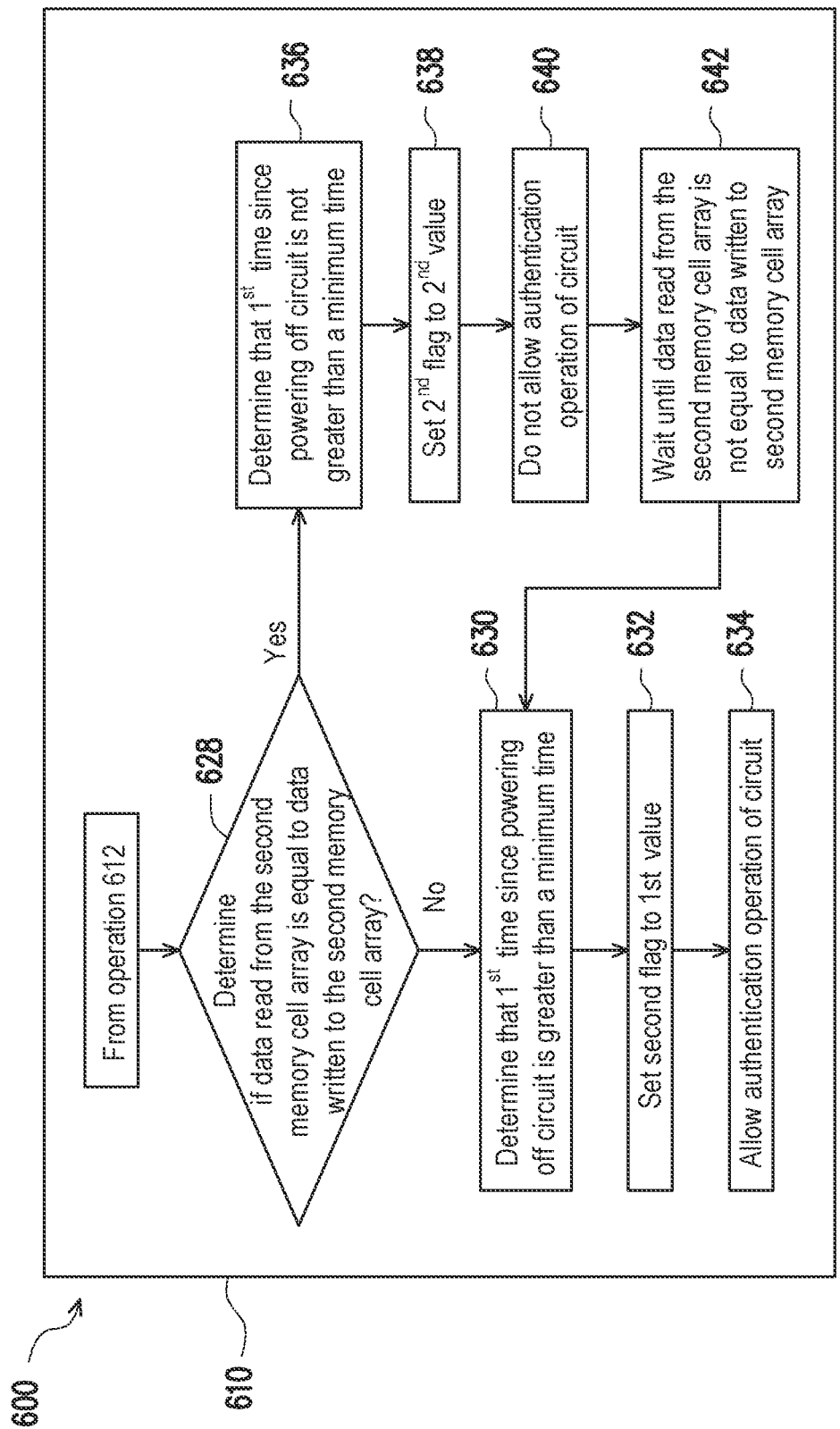

Further details of one or more embodiments of the authentication process are further discussed in method 600 of FIGS. 6A-6C.

In some embodiments, by memory cell arrays 102 and 502 having different array sizes or power circuits 520 and 522 having different capacitance values, the retention time of data stored in memory cell arrays 102 and 502 is different. In some embodiments, by configuring memory cell arrays 102 and 502 to have different retention times, integrated circuit 500 effectively has two different timers thereby providing further security/protection of the contents of integrated circuit 500 compared to other approaches, over a range of different temperature regions.

Other configurations of integrated circuit 500 are within the scope of the present disclosure.

FIGS. 6A-6C are a flowchart of a method 600 of operating an integrated circuit, in accordance with some embodiments.

In some embodiments, FIGS. 6A-6C are a flowchart of a method of operating integrated circuit 500, 700 or system 800 of corresponding FIG. 8. It is understood that additional operations may be performed before, during, and/or after the method 600 depicted in FIGS. 6A-6C, and that some other operations may only be briefly described herein. In some embodiments, other order of operations of method 600 is within the scope of the present disclosure. In some embodiments, one or more operations of method 600 are not performed.

Method 600 includes exemplary operations, but the operations are not necessarily performed in the order shown. Operations may be added, replaced, changed order, and/or eliminated as appropriate, in accordance with the spirit and scope of disclosed embodiments. It is understood that method 600 utilizes features of one or more of integrated circuit 500 or 700, memory circuit 200, memory cell 300, or system 800.

In operation 602 of method 600, data is written to each memory cell in a first memory cell array and a second memory cell array.

In some embodiments, the first memory cell array of method 600 includes at least memory cell array 202 or 502. In some embodiments, the first memory cell array of method 600 includes memory circuit 200. In some embodiments, the integrated circuit of method 600 includes at least integrated circuit 500 or 700 or system 800.

In some embodiments, the second memory cell array of method 600 includes at least memory cell array 102 or 202. In some embodiments, the second memory cell array of method 600 includes memory circuit 200.

In some embodiments, the same data (e.g., logic "0" or "1") is written to each memory cell in the first memory cell array and the second memory cell array. In some embodiments, operation 602 includes writing a logic 1 to each memory cell in the first memory cell array and the second memory cell array. In some embodiments, operation 602 is performed by controller 104. In some embodiments, operation 602 is performed by at least a write driver circuit in X-decoder circuit 106. In some embodiments, each memory cell in the first memory cell array and the second memory cell array of method 600 includes at least memory cell MCB in FIG. 2 or memory cell 300 in FIG. 3.

In some embodiments, data is written to each memory cell in the first memory cell array and the second memory cell array in response to powering on or turning on integrated circuit 500. In some embodiments, data is written to each memory cell in the first memory cell array and the second memory cell array in response to a user successfully logging into the integrated circuit. In some embodiments, operation 602 is performed in response to other operations of the integrated circuit.

In some embodiments, operation 602 includes writing a logical high to memory cell 300. In some embodiments, operation 602 includes turning on NMOS transistors N3 and N4 in response to a word line signal on word line WL, providing a logical high as the voltage on the bit line BL or bit line bar BLB, and then turning off NMOS transistors N3 and N4 in response to a word line signal on word line WL.

In operation 604 of method 600, the integrated circuit is powered off or turned off. In some embodiments, operation 604 is performed by a user.

In some embodiments, powering off or turning off the integrated circuit of method 600 includes disconnecting the integrated circuit from a power source or a supply voltage. In some embodiments, powering off or turning off the integrated circuit of method 600 includes removing a battery from the integrated circuit. In some embodiments, powering off or turning off the integrated circuit of method 600 includes removing a capacitor from the integrated circuit.

In operation 606 of method 600, the integrated circuit is powered on or turned on. In some embodiments, operation 606 is performed by a user.

In some embodiments, powering on or turning on the integrated circuit of method 600 includes connecting the integrated circuit to a power source or a supply voltage. In some embodiments, powering on or turning on the integrated circuit of method 600 includes connecting a battery to the integrated circuit. In some embodiments, powering on or turning on the integrated circuit of method 600 includes connecting a capacitor to the integrated circuit.

In operation 608 of method 600, data is read from at least each memory cell in the first memory cell array or the second memory cell array in response to powering on the integrated circuit.

In some embodiments, operation 608 is performed by controller 104. In some embodiments, operation 608 is performed by at least a sense amplifier circuit in read circuit 110.

In some embodiments, operation 608 includes pre-charging bit line BL and bit line bar BLB to a pre-charge voltage VBL, turning on NMOS transistors N3 and N4 in response to a word line signal on word line WL, turning on a sense amplifier circuit in response to a sense amplifier enable signal, and latching the data stored in memory cell 300. In some embodiments, pre-charge voltage VBL is equal to supply voltage VDD. In some embodiments, pre-charge voltage VBL is equal to supply reference voltage VSS. In some embodiments, pre-charge voltage VBL is between supply voltage VDD and reference voltage VSS.

In operation 610 of method 600, a determination is made whether to allow an authentication operation of the integrated circuit in response to reading data from at least each memory cell in the first memory cell array or the second memory cell array. In some embodiments, operation 610 is performed by controller 104. In some embodiments, operation 610 is performed by a processor, such as processor 802 of FIG. 8.

In some embodiments, operation 610 includes at least operation 612, 614, 616, 618, 620, 622, 624, 626, 628, 630, 632, 634, 636, 638, 640 or 642.

In operation 612 of method 600, a determination is made if data read from the first memory cell array is equal to data written to the first memory cell array. In some embodiments, operation 612 further includes a determination being made if data read from at least one memory cell in the first memory cell array is equal to data written to the at least one memory cell in the first memory cell array.

In some embodiments, operation 612 is performed by controller 104. In some embodiments, operation 612 is performed by a processor, such as processor 802 in system 800 of FIG. 8.

In some embodiments, if the data read from at least one memory cell in the first memory cell array is equal to data written to the at least one corresponding memory cell in the first memory cell array, then the first leakage current is insufficient to cause the data stored in first memory cell array to change logic states since being powered off, thus indicating an insufficient amount of time has elapsed since integrated circuit 500 was powered off, and the result of operation 612 is a "yes", and method 600 proceeds to operation 614.

In some embodiments, the first memory cell array of method 600 includes memory cell array 502. In some embodiments, the first leakage current of method 600 includes the second leakage current of memory cell array 502. In some embodiments, the first leakage current of method 600 is dictated by at least the size of the first memory cell array or the capacitance of the first power supply that the first memory cell array is coupled to. In some embodiments, the first power supply of method 600 is power supply 522.

In some embodiments, memory cell array 502 is configured to have memory cells that lose data retention at a second temperature region Temp2 after a duration of time (e.g., first time T1). In some embodiments, in comparison with memory cell array 102, memory cell array 502 is configured to have the second leakage path (e.g., larger) having the second leakage current (e.g., larger), and memory cells in memory cell array 502 are configured to lose data retention at a second temperature region Temp2 (e.g., lower temperature) after a duration of time (e.g., first time T1). Stated differently, in some embodiments, memory cell array 502 is configured or designed to discharge at a lower temperature by the fast (e.g., faster) leakage path after a duration of the first time T1.

In some embodiments, if the data read from at least one memory cell in the first memory cell array is not equal to data written to the at least one corresponding memory cell in the first memory cell array, then the first leakage current is sufficient to cause the data stored in at least one memory cell in the first memory cell array to change logic states since being powered off, thus indicating a sufficient amount of time has elapsed since integrated circuit 500 was powered off, and the result of operation 612 is a "no", and method 600 proceeds to operation 620.

In operation 614 of method 600, a determination is made that the first time T1 since powering off the integrated circuit is not greater than the minimum time of the log-in timer. In some embodiments, operation 614 indicates that an insufficient amount of time (e.g., first time T1) has elapsed since integrated circuit 500 was powered off, and the amount of time (e.g., first time T1) is thus not greater than the minimum time of the log-in timer.

In some embodiments, operation 614 is performed by controller 104. In some embodiments, operation 614 is performed by a processor, such as processor 802 in system 800 of FIG. 8.

In some embodiments, operation 614 includes controller 104 determining that an insufficient amount of time has passed since integrated circuit 500 was powered off, thereby determining that the first time T1 since powering off the integrated circuit is effectively not greater than the minimum time of the log-in timer.

In operation 616 of method 600, a first flag is set to a first value in response to determining that the first time T1 since powering off the integrated circuit is not greater than the minimum time.

In some embodiments, the first flag of method 600 corresponds to a single bit of data. In some embodiments, the first flag method 600 corresponds to a more than a single bit of data. In some embodiments, the first value of the first flag is equal to a logic 1. In some embodiments, the first value of the first flag is equal to a logic 0.

In some embodiments, operation 616 is performed by controller 104. In some embodiments, operation 616 is performed by a processor, such as processor 802 in system 800 of FIG. 8.

In operation 618 of method 600, an authentication operation of the integrated circuit is not allowed or not performed in response to the first flag being the first value.

In some embodiments, operation 618 is performed by controller 104 or system 800.

In some embodiments, operation 618 is performed by a processor, such as processor 802 in system 800 of FIG. 8.

In some embodiments, operation 618 includes not prompting the user with the password authentication or logging in operation(s). In some embodiments, operation 618 includes disabling the password authentication or logging in operation for the user such that system 800 does not prompt the user with the password authentication or logging in operation(s).

In operation 620 of method 600, additional read operations of the first memory cell array are performed. In some embodiments, the additional read operations of operation 620 are performed until data read from the first memory cell is not equal to data written to the first memory cell. In some embodiments, the additional read operations of operation 620 are performed until data read from at least one memory cell in the first memory cell array changes logic states. In some embodiments, the additional read operations are performed in operation 620 to determine if at least one memory cell in the first memory cell array changes logic states.

In some embodiments, operation 620 is performed by controller 104 or system 800. In some embodiments, operation 620 is performed by a processor, such as processor 802 in system 800 of FIG. 8.

In some embodiments, after operation 618, method 600 proceeds to operation 620 to perform additional read operations of the first memory cell array until a sufficient amount of time (e.g., first time T1) has elapsed since integrated circuit 500 was powered off, thereby allowing the user to proceed to the authentication operation of operation 626. In some embodiments, at operation 620, method 600 remains in an idle state until the log-in timer expires.

In operation 622 of method 600, a determination is made that a first time T1 since powering off the integrated circuit is greater than a minimum time of the log-in timer. In some embodiments, operation 622 indicates that a sufficient amount of time (e.g., first time T1) has elapsed since integrated circuit 500 was powered off, and the amount of time (e.g., first time T1) is thus greater than the minimum time of the log-in timer.

In some embodiments, operation 622 is performed by controller 104. In some embodiments, operation 622 is performed by a processor, such as processor 802 in system 800 of FIG. 8.

In some embodiments, operation 622 includes controller 104 determining that a sufficient amount of time has passed since integrated circuit 500 was powered off, thereby determining that the first time T1 since powering off the integrated circuit is effectively greater than the minimum time of the log-in timer.

In operation 624 of method 600, the first flag is set to a second value in response to determining that the first time T1 since powering off the integrated circuit is greater than the minimum time.

In some embodiments, the second value of the first flag is different from the first value of the first flag. In some embodiments, the first value of the first flag is equal to a logic 1, and the second value of the first flag is a logic 0. In some embodiments, the first value of the first flag is equal to a logic 0, and the second value of the first flag is a logic 1.

In some embodiments, operation 624 is performed by controller 104. In some embodiments, operation 624 is performed by a processor, such as processor 802 in system 800 of FIG. 8.

In operation 626 of method 600, an authentication operation of the integrated circuit is allowed or performed in response to the first flag being the second value.

In some embodiments, operation 626 is performed by controller 104 or system 800.

In some embodiments, operation 626 is performed by a processor, such as processor 802 in system 800 of FIG. 8.

In some embodiments, operation 626 includes prompting the user with a password authentication or logging in operation(s). In some embodiments, operation 626 includes enabling the password authentication or logging in operation for the user such that system 800 prompts the user with the password authentication or logging in operation(s). In some embodiments, the authentication operation includes providing the user an attempt to log into integrated circuit 500 by prompting the user for a password.

In operation 628 of method 600, a determination is made if data read from the second memory cell array is equal to data written to the second memory cell array.

In some embodiments, operation 628 further includes a determination being made if data read from at least one memory cell in the second memory cell array is equal to data written to the at least one memory cell in the second memory cell array.

In some embodiments, operation 628 is performed by controller 104. In some embodiments, operation 628 is performed by a processor, such as processor 802 in system 800 of FIG. 8.

In some embodiments, if the data read from at least one memory cell in the second memory cell array is not equal to data written to the at least one corresponding memory cell in the second memory cell array, then the second leakage current is sufficient to cause the data stored in at least one memory cell in the second memory cell array to change logic states since being powered off, thus indicating a sufficient amount of time has elapsed since integrated circuit 500 was powered off, and the result of operation 628 is a "no", and method 600 proceeds to operation 630.

In some embodiments, the second memory cell array of method 600 includes memory cell array 102. In some embodiments, the second leakage current of method 600 includes the first leakage current of memory cell array 102 in FIG. 5. In some embodiments, the second leakage current of method 600 is dictated by at least the size of the second memory cell array or the capacitance of the second power supply that the second memory cell array is coupled to. In some embodiments, the second power supply of method 600 is power supply 520.

In some embodiments, memory cell array 102 is configured to have memory cells that lose data retention at a first temperature region Temp1 after a duration of time (e.g., first time T1). In some embodiments, in comparison with memory cell array 502, memory cell array 102 is configured to have a first leakage path (e.g., smaller) having a first leakage current (e.g., smaller), and memory cells in memory cell array 102 are configured to lose data retention at a first temperature region Temp1 (e.g., higher temperature) after a duration of time (e.g., first time T1). Stated differently, in some embodiments, memory cell array 102 is configured or designed to discharge at a higher temperature by the low (e.g., slow) leakage path after a duration of the first time T1.

In some embodiments, if the data read from at least one memory cell in the second memory cell array is equal to data written to the at least one corresponding memory cell in the second memory cell array, then the second leakage current is insufficient to cause the data stored in second memory cell array to change logic states since being powered off, thus indicating an insufficient amount of time has elapsed since integrated circuit 500 was powered off, and the result of operation 628 is a "yes", and method 600 proceeds to operation 636.

In operation 630 of method 600, a determination is made that a first time T1 since powering off the integrated circuit is greater than a minimum time of the log-in timer. In some embodiments, operation 630 indicates that a sufficient amount of time (e.g., first time T1) has elapsed since integrated circuit 500 was powered off, and the amount of time (e.g., first time T1) is thus greater than the minimum time of the log-in timer.

In some embodiments, operation 630 is performed by controller 104. In some embodiments, operation 630 is performed by a processor, such as processor 802 in system 800 of FIG. 8.

In some embodiments, operation 630 includes controller 104 determining that a sufficient amount of time has passed since integrated circuit 500 was powered off, thereby determining that the first time T1 since powering off the integrated circuit is effectively greater than the minimum time of the log-in timer.

In operation 632 of method 600, a second flag is set to a first value in response to determining that the first time T1 since powering off the integrated circuit is greater than the minimum time.

In some embodiments, the second flag of method 600 corresponds to a single bit of data. In some embodiments, the second flag method 600 corresponds to more than a single bit of data. In some embodiments, the first value of the second flag is equal to a logic 1. In some embodiments, the first value of the second flag is equal to a logic 0.

In some embodiments, operation 632 is performed by controller 104. In some embodiments, operation 632 is performed by a processor, such as processor 802 in system 800 of FIG. 8.

In operation 634 of method 600, an authentication operation of the integrated circuit is allowed or performed in response to the second flag being the first value.

In some embodiments, operation 634 is performed by controller 104 or system 800. In some embodiments, operation 634 is performed by a processor, such as processor 802 in system 800 of FIG. 8.

In some embodiments, operation 634 includes prompting the user with a password authentication or logging in operation(s). In some embodiments, operation 634 includes enabling the password authentication or logging in operation for the user such that system 800 prompts the user with the password authentication or logging in operation(s). In some embodiments, the authentication operation includes providing the user an attempt to log into integrated circuit 500 by prompting the user for a password.

In operation 636 of method 600, a determination is made that the first time T1 since powering off the integrated circuit is not greater than the minimum time of the log-in timer. In some embodiments, operation 636 indicates that an insufficient amount of time (e.g., first time T1) has elapsed since integrated circuit 500 was powered off, and the amount of time (e.g., first time T1) is thus not greater than the minimum time of the log-in timer.

In some embodiments, operation 636 is performed by controller 104. In some embodiments, operation 636 is performed by a processor, such as processor 802 in system 800 of FIG. 8.

In some embodiments, operation 636 includes controller 104 determining that an insufficient amount of time has passed since integrated circuit 500 was powered off, thereby determining that the first time T1 since powering off the integrated circuit is effectively not greater than the minimum time of the log-in timer.

In operation 638 of method 600, the second flag is set to a second value in response to determining that the first time T1 since powering off the integrated circuit is not greater than the minimum time.

In some embodiments, the second value of the second flag is different from the first value of the second flag. In some embodiments, the second value of the second flag is equal to a logic 1, and the first value of the second flag is a logic 0. In some embodiments, the second value of the second flag is equal to a logic 0, and the first value of the second flag is a logic 1.

In some embodiments, operation 638 is performed by controller 104. In some embodiments, operation 638 is performed by a processor, such as processor 802 in system 800 of FIG. 8.

In operation 640 of method 600, an authentication operation of the integrated circuit is not allowed or not performed in response to the second flag being the second value.

In some embodiments, operation 640 is performed by controller 104 or system 800. In some embodiments, operation 640 is performed by a processor, such as processor 802 in system 800 of FIG. 8.

In some embodiments, operation 640 includes not prompting the user with the password authentication or logging in operation(s). In some embodiments, operation 640 includes disabling the password authentication or logging in operation for the user such that system 800 does not prompt the user with the password authentication or logging in operation(s).

In operation 642 of method 600, additional read operations of the second memory cell array are performed. In some embodiments, the additional read operations of operation 642 are performed until data read from the second memory cell is not equal to data written to the second memory cell. In some embodiments, the additional read operations of operation 642 are performed until data read from at least one memory cell in the second memory cell array changes logic states. In some embodiments, the additional read operations are performed in operation 642 to determine if at least one memory cell in the second memory cell array changes logic states. In some embodiments, at operation 642, method 600 remains in an idle state until the log-in timer expires.

In some embodiments, operation 642 is performed by controller 104 or system 800. In some embodiments, operation 642 is performed by a processor, such as processor 802 in system 800 of FIG. 8.

In some embodiments, after operation 642, method 600 proceeds to operation 630.

By operating method 600, the integrated circuit operates to achieve the benefits discussed above with respect to integrated circuit 500. While method 600 was described above with reference to FIGS. 1, 2 and 3, it is understood that method 600 utilizes the features of one or more of FIGS.

7-8. In some embodiments, method 600 was described above with reference to SRAM, but is applicable to DRAM or eDRAM as well, and similar detailed description is omitted.

Figure 7:
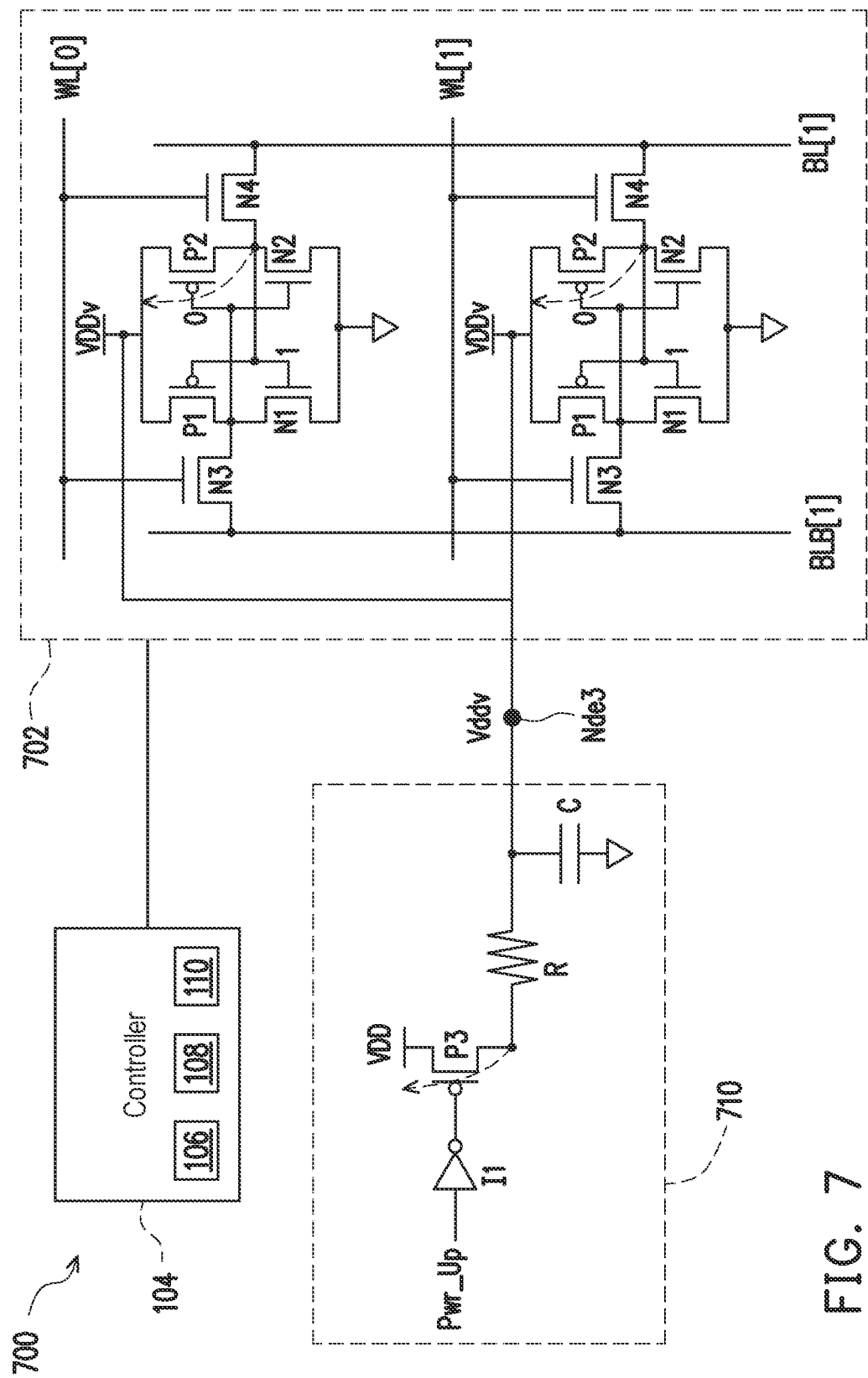
FIG. 7 is a circuit diagram of an integrated circuit, in accordance with some embodiments.

FIG. 7 is a circuit diagram of an integrated circuit 700, in accordance with some embodiments.

Integrated circuit 700 relates to integrated circuit 500 of FIG. 5. Integrated circuit 700 is an embodiment of a portion of integrated circuit 500, and similar detailed description is omitted.

Integrated circuit 700 includes controller 104, a memory cell array 702 and a power circuit 710.

Memory cell array 702 is an embodiment of a portion of memory cell array 102 or 502 in FIG. 5, and power circuit 710 is an embodiment of power circuit 520 or 522 in FIG. 5, and similar detailed description is omitted. For example, in some embodiments, memory cell array 702 is an embodiment of two memory cells in memory cell array 102 in FIG. 5, and power circuit 710 is an embodiment of power circuit 520 in FIG. 5, and similar detailed description is omitted. For example, in some embodiments, memory cell array 702 is an embodiment of two memory cells in memory cell array 502 in FIG. 5, and power circuit 710 is an embodiment of power circuit 522 in FIG. 5, and similar detailed description is omitted.

Memory cell array 702 is an embodiment of two memory cells MCB of memory cell array 202 in FIG. 2, and similar detailed description is omitted.

Memory cell array 702 includes memory cell 704 and memory cell 706. In some embodiments, memory cell 704 is an embodiment of memory cell MCB in column 1 and row 1 of memory cell array 202, and memory cell 706 is an embodiment of memory cell MCB in column 1 and row 2 of memory cell array 202, and similar detailed description is omitted. In some embodiments, each of memory cell 704 and memory cell 706 corresponds to memory cell 300 in FIG. 3, and similar detailed description is omitted. Other memory cells in memory cell array 202 are within the scope of the present disclosure.

Memory cell 704 is coupled to word line WL[1], bit line BL[1], bit line bar BLB[1], controller 102, and power circuit by node Nde3. Memory cell 706 is coupled to word line WL[2], bit line BL[2], bit line bar BLB[2], controller 102, and power circuit by node Nde3.

In some embodiments, node Nde3 is an embodiment of node Nde1 of power circuit 520 or node Nde2 of power circuit 520, and similar detailed description is omitted.

In some embodiments, node Nde3 is configured to receive supply voltage Vddv from power circuit 710. In some embodiments, supply voltage Vddv corresponds to supply voltage Vddv1 of power circuit 520 or supply voltage Vddv2 of power circuit 520, and similar detailed description is omitted.

Power circuit 710 is configured to provide a supply Vddv that adjusts the discharge time of memory cell 704 or 706. Power circuit 710 is coupled to memory cells 704 and 706 by node Nde3. Power circuit 710 is configured to supply memory cells 704 and 706 with supply voltage Vddv at node Nde3. In some embodiments, power circuit 710 is coupled to memory cell 704, and memory cell 706 is directly coupled to supply voltage VDD.

Power circuit 710 includes a driver circuit I1, a PMOS transistor P3, a resistor R1 and a capacitor C1. In some embodiments, driver circuit I1 is an inverter.

Driver circuit I1 is coupled to a gate of PMOS transistor P3. An input terminal of driver circuit I1 is configured to receive a power control signal Pwr_Up. An output terminal of driver circuit I1 is configured to generate an output power control signal Pwr_UpB. In some embodiments, output power control signal Pwr_UpB is inverted from power control signal Pwr_Up in response to driver circuit I1 being an inverter.

An output terminal of driver circuit I1 is coupled to a gate of PMOS transistor P3. Driver circuit I1 is configured to turn on/off PMOS transistor P3 based on output power control signal Pwr_UpB.

A source of PMOS transistor P3 is coupled to supply voltage VDD. A drain of PMOS transistor P3 is coupled to a first end of resistor R1. A second end of resistor R1 is coupled to at least node Nde3 and a first end of capacitor C1. A second end of capacitor C1 is coupled to reference supply voltage VSS.

In response to being turned on, PMOS transistor P3 is configured to provide supply voltage VDD to the first end of resistor R1. In response to being turned off, PMOS transistor P3 is configured to not provide supply voltage VDD to the first end of resistor R1. In some embodiments, supply voltage VDD is equal to supply voltage Vddv. In some embodiments, supply voltage VDD is different from supply voltage Vddv.

In some embodiments, resistor R1 corresponds to the internal resistance of power circuit 710. In some embodiments, resistor R1 corresponds to an additional resistor added to power circuit 710. In some embodiments, resistor R1 is a thin film resistor or a well resistor. In some embodiments, resistor R1 is a polysilicon resistor.

In some embodiments, capacitor C1 corresponds to the internal capacitance of power circuit 710. In some embodiments, capacitor C1 corresponds to an additional capacitor added to power circuit 710 to adjust the capacitance of the power circuit. In some embodiments, capacitor C1 is adjusted as discussed in FIG. 5 to thereby adjust the data retention time of memory cell array 102 or 502. In some embodiments, capacitor C1 is implemented by a metal insulator metal (MIM) capacitor or a metal oxide metal (MOM) capacitor. In some embodiments, a capacitance per unit of area for capacitor C1 ranges from about 2 $fF/\mu m^2$ to about 5 $fF/\mu m^2$. In some embodiments, a power per unit of area for resistor R1 ranges from about 5 $KW/\mu m^2$ to about 10 $KW/\mu m^2$.

Other configurations or number of elements for power circuit 710 are within the scope of the present disclosure.

Other configurations or number of elements for integrated circuit 700 are within the scope of the present disclosure.

FIG. 8 is a schematic view of a system 800, in accordance with some embodiments.

In some embodiments, system 800 is an embodiment of at least controller 104 of FIG. 1, 5 or 7, and similar detailed description is therefore omitted.

In some embodiments, system 800 is an embodiment of at least integrated circuit 100, 400 or 700 of FIG. 1, 4 or 7, and similar detailed description is therefore omitted.

In some embodiments, portions of system 800 is an embodiment of at least memory circuit 200 of FIG. 2 or memory cell 300 of FIG. 3, and similar detailed description is therefore omitted.

In some embodiments, system 800 is configured to control one or more of memory cell array 102 or 202, memory cell 300, X-decoder circuit 106, Y-decoder circuit 108, read circuit 110, or memory circuit 200 or 702. In some embodiments, system 800 is configured to perform one or more operations of method 400 or method 600.

System 800 includes a hardware processor 802 and a non-transitory, computer readable storage medium 804 (e.g., memory 804) encoded with, i.e., storing, the computer program code 806, i.e., a set of executable instructions 806. Computer readable storage medium 804 is configured for interfacing with at least memory cell array 102 or 202, memory cell 300, X-decoder circuit 106, Y-decoder circuit 108, read circuit 110, or memory circuit 200 or 702, or at least controller 104 of FIG. 1, 5 or 7, at least integrated circuit 100, 400 or 700 of FIG. 1, 4 or 7.

The processor 802 is electrically coupled to the computer readable storage medium 804 by a bus 808. The processor 802 is also electrically coupled to an I/O interface 810 by bus 808. A network interface 812 is also electrically connected to the processor 802 by bus 808. Network interface 812 is connected to a network 814, so that processor 802 and computer readable storage medium 804 are capable of connecting to external elements by network 814. The processor 802 is configured to execute the computer program code 806 encoded in the computer readable storage medium 804 in order to cause system 800 to be usable for performing a portion or all of the operations as described in at least method 400 or 600. In some embodiments, network 814 is not part of system 800.

In some embodiments, the processor 802 is a central processing unit (CPU), a multi-processor, a distributed processing read circuit, an application specific integrated circuit (ASIC), and/or a suitable processing unit.

In some embodiments, the computer readable storage medium 804 is an electronic, magnetic, optical, electromagnetic, infrared, and/or a semiconductor read circuit (or apparatus or device). For example, the computer readable storage medium 804 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 804 includes a compact disk-read only memory (CD-ROM), a compact disk-read/write (CD-R/W), and/or a digital video disc (DVD).

In some embodiments, the storage medium 804 stores the computer program code 806 configured to cause system 800 to perform one or more operations of at least method 400 or 600. In some embodiments, the storage medium 804 also stores information used for performing at least method 400 or 600 as well as information generated during performing at least method 400 or 600, such as first time 816, minimum time 818, data 820, flag 822 and user interface 824, and/or a set of executable instructions to perform one or more operations of at least method 400 or 600.

In some embodiments, the storage medium 804 stores instructions (e.g., computer program code 806) for interfacing with at least memory cell array 102 or 202, memory cell 300, X-decoder circuit 106, Y-decoder circuit 108, read circuit 110, or memory circuit 200 or 702, controller 104, integrated circuit 100, 400 or 700. The instructions (e.g., computer program code 806) enable processor 802 to generate instructions readable by at least memory cell array 102 or 202, memory cell 300, X-decoder circuit 106, Y-decoder circuit 108, read circuit 110, or memory circuit 200 or 702, controller 104, integrated circuit 100, 400 or 700 to effectively implement one or more operations of at least method 400 or 600 during operation of integrated circuit 100, 500 or 700.

System 800 includes I/O interface 810. I/O interface 810 is coupled to external circuitry. In some embodiments, I/O interface 810 includes a keyboard, keypad, mouse, trackball, trackpad, and/or cursor direction keys for communicating information and commands to processor 802

System 800 also includes network interface 812 coupled to the processor 802. Network interface 812 allows system 800 to communicate with network 814, to which one or more other computer read circuits are connected. Network interface 812 includes wireless network interfaces such as BLUETOOTH, WIFI, WIMAX, GPRS, or WCDMA; or wired network interface such as ETHERNET, USB, or IEEE-884. In some embodiments, at least method 400 or 600 is implemented in two or more read circuits 800, and information such as first time, minimum time, data, flag and user interface are exchanged between different read circuits 800 by network 814.

System 800 is configured to receive information related to first time values through I/O interface 810 or network interface 812. The information is transferred to processor 802 by bus 808 to determine, measure or compare first time values since powering off integrated circuit 100, 500 or 700. The first time values are then stored in computer readable medium 804 as first time 816. In some embodiments, first time 816 includes one or more of first time from method 400 or 600. System 800 is configured to receive information related to a minimum time through I/O interface 810 or network interface 812. The information is stored in computer readable medium 804 as minimum time 818. In some embodiments, the minimum time includes the minimum time of method 400 or 600. System 800 is configured to receive information related to data through I/O interface 810 or network interface 812. The information is stored in computer readable medium 804 as data 820. In some embodiments, the data includes at least the data written or the data read of method 400 or 600. System 800 is configured to receive information related to a flag through I/O interface 810 or network interface 812. The information is stored in computer readable medium 804 as flag 822. In some embodiments, the flag includes at least the flag of method 400, the first flag of method 600, or the second flag of method 600. System 800 is configured to receive information related to a user interface through I/O interface 810 or network interface 812. The information is stored in computer readable medium 804 as user interface 824.

In some embodiments, at least method 400 or 600 is implemented as a standalone software application for execution by a processor. In some embodiments, at least method 400 or 600 is implemented as a software application that is a part of an additional software application. In some embodiments, at least method 400 or 600 is implemented as a plug-in to a software application. In some embodiments, at least method 400 or 600 is implemented as a software application that is a portion of an authentication tool. In some embodiments, at least method 400 or 600 is implemented as a software application that is used by an authentication tool. In some embodiments, the authentication tool is used to authenticate credentials of a user of at least memory circuit 100, 400 or 500.

In some embodiments, at least method 400 or 600 is implemented by an integrated circuit such as integrated circuit 100, 500 or 700 to operate at least memory circuit 200 or memory cell array 102 or 202 based on one or more instructions generated by system 800.

In some embodiments, one or more of the operations of method 400 or 600 is not performed. Furthermore, various N-type or P-type transistors shown in FIG. 3 is of a particular dopant type (e.g., N-type or P-type) are for illustration purposes. Embodiments of the disclosure are not limited to a particular transistor type, and one or more of the N-type transistors or P-type shown in FIG. 3 can be substituted with a corresponding transistor of a different transistor/ dopant type. Similarly, the low or high logical value of various signals used in the above description is also for illustration. Embodiments of the disclosure are not limited to a particular logical value when a signal is activated and/or deactivated. Selecting different logical values is within the scope of various embodiments. Selecting different numbers of transistors in FIG. 3 is within the scope of various embodiments.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

One aspect of this description relates to an integrated circuit. The integrated circuit includes a first memory cell array and a controller coupled to the first memory cell array. In some embodiments, the first memory cell array includes a first array of volatile memory cells having a first retention data time. In some embodiments, the controller is configured to write data to each memory cell in the first memory cell array in response to the integrated circuit being successfully logged into, read data from each memory cell in the first memory cell array in response to the integrated circuit being powered on, and determine whether to allow an authentication operation of the integrated circuit in response to reading data from each memory cell in the first memory cell array.

Another aspect of this description relates to an integrated circuit. The integrated circuit includes a first memory cell array, a controller and a second memory cell array. In some embodiments, the first memory cell array includes a first array of volatile memory cells having a first retention data time. In some embodiments, the controller is coupled to the first memory cell array. In some embodiments, the controller is configured to write data to each memory cell in the first memory cell array in response to the integrated circuit being successfully logged into, read data from each memory cell in the first memory cell array in response to the integrated circuit being powered on, and determine whether to allow an authentication operation of the integrated circuit in response to reading data from each memory cell in the first memory cell array. In some embodiments, the second memory cell array is coupled to the controller. In some embodiments, the second memory cell array includes a second array of volatile memory cells having a second retention data time different from the first retention data time, a first size of the first memory cell array is different from a second size of the second memory cell array.

Still another aspect of this description relates to an integrated circuit. The integrated circuit includes a first memory cell array. In some embodiments, the first memory cell array includes a first array of volatile memory cells having a first retention data time, and a controller coupled to the first memory cell array. In some embodiments, the controller is configured to write a logic 1 as data to each memory cell in the first memory cell array in response to the integrated circuit being successfully logged into, read data from each memory cell in the first memory cell array in response to the integrated circuit being connected to a supply voltage after being disconnected from the supply voltage, and determine whether to allow an authentication operation of the integrated circuit in response to reading data from each memory cell in the first memory cell array and after the integrated circuit is connected to the supply voltage after being disconnected from the supply voltage.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit, comprising:
a first memory cell array comprising:
a first array of volatile memory cells having a first retention data time; and
a controller coupled to the first memory cell array, the controller being configured to:
write data to each memory cell in the first memory cell array in response to the integrated circuit being successfully logged into;
read data from each memory cell in the first memory cell array in response to the integrated circuit being powered on; and
determine whether to allow an authentication operation of the integrated circuit in response to reading data from each memory cell in the first memory cell array.

2. The integrated circuit of claim 1, wherein the controller being configured to write data to each memory cell in the first memory cell array comprises:
the controller being configured to write a logic 1 to each memory cell in the first memory cell array.

3. The integrated circuit of claim 1, wherein the controller being configured to determine whether to allow the authentication operation of the integrated circuit comprises:
the controller being configured to determine data read from at least one memory cell in the first memory cell array is not equal to data written to the at least one memory cell in the first memory cell array.

4. The integrated circuit of claim 3, wherein the controller being configured to determine whether to allow the authentication operation of the integrated circuit further comprises the controller being further configured to:
determine a first time since powering off the integrated circuit is greater than a minimum time in response to the controller being configured to determine the data read from the at least one memory cell in the first memory cell array is not equal to the data written to the at least one memory cell in the first memory cell array;
set a flag to a first value in response to the controller being configured to determine the first time since powering off the integrated circuit is greater than the minimum time; and
allow an authentication operation of the integrated circuit in response to the flag being the first value.

5. The integrated circuit of claim 4, wherein the controller being configured to determine whether to allow the authentication operation of the integrated circuit comprises:
the controller being configured to determine the data read from the at least one memory cell in the first memory cell array is equal to the data written to the at least one memory cell in the first memory cell array.

6. The integrated circuit of claim 5, wherein the controller being configured to determine whether to allow the authentication operation of the integrated circuit further comprises the controller being further configured to:
   determine the first time since powering off the integrated circuit is not greater than the minimum time in response to the controller being configured to determine the data read from the at least one memory cell in the first memory cell array is equal to the data written to the at least one memory cell in the first memory cell array;
   set the flag to a second value in response to the controller being configured to determine the first time since powering off the integrated circuit is not greater than the minimum time, the second value being different from the first value; and
   not allow the authentication operation of the integrated circuit in response to the flag being the second value.

7. The integrated circuit of claim 1, wherein
   the integrated circuit is powered off, and the integrated circuit is powered on after being powered off;
   the controller configured to read data from each memory cell in the first memory cell array in response to the integrated circuit being powered on comprises:
      the controller being further configured to read data from each memory cell in the first memory cell array in response to the integrated circuit being powered on after being powered off; and
   the controller configured to determine whether to allow the authentication operation of the integrated circuit in response to reading data from each memory cell in the first memory cell array comprises:
      the controller being further configured to determine whether to allow the authentication operation of the integrated circuit in response to reading data from each memory cell in the first memory cell array after the integrated circuit is powered on after being powered off.

8. An integrated circuit, comprising:
   a first memory cell array comprising:
      a first array of volatile memory cells having a first retention data time;
   a controller coupled to the first memory cell array, the controller being configured to:
      write data to each memory cell in the first memory cell array in response to the integrated circuit being successfully logged into;
      read data from each memory cell in the first memory cell array in response to the integrated circuit being powered on; and
      determine whether to allow an authentication operation of the integrated circuit in response to reading data from each memory cell in the first memory cell array;
   a second memory cell array coupled to the controller, the second memory cell array comprising:
      a second array of volatile memory cells having a second retention data time different from the first retention data time, a first size of the first memory cell array is different from a second size of the second memory cell array.

9. The integrated circuit of claim 8, wherein the controller is further configured to:
   write data to each memory cell in the second memory cell array in response to the integrated circuit being successfully logged into;
   read data from each memory cell in the second memory cell array in response to the integrated circuit being powered on; and
   determine whether to allow the authentication operation of the integrated circuit in response to reading data from each memory cell in the second memory cell array.

10. The integrated circuit of claim 9, wherein the controller configured to:
   write data to each memory cell in the first memory cell array comprises:
      the controller being configured to write a logic 1 to each memory cell in the first memory cell array; and
   write data to each memory cell in the second memory cell array comprises:
      the controller being configured to write the logic 1 to each memory cell in the second memory cell array.

11. The integrated circuit of claim 9, wherein the controller configured to determine whether to allow the authentication operation of the integrated circuit in response to reading data from each memory cell in the first memory cell array comprises:
   the controller being configured to determine whether data read from at least one memory cell in the first memory cell array is equal to data written to the at least one memory cell in the first memory cell array.

12. The integrated circuit of claim 11, wherein the controller configured to determine whether the data read from the at least one memory cell in the first memory cell array is equal to the data written to the at least one memory cell in the first memory cell array comprises:
   the controller being configured to determine the data read from the at least one memory cell in the first memory cell array is equal to the data written to the at least one memory cell in the first memory cell array.

13. The integrated circuit of claim 12, wherein the controller configured to determine whether to allow the authentication operation of the integrated circuit in response to reading data from each memory cell in the first memory cell array further comprises the controller being configured to:
   determine a first time since powering off the integrated circuit is not greater than a minimum time in response to the controller being configured to determine the data read from the at least one memory cell in the first memory cell array is equal to the data written to the at least one memory cell in the first memory cell array;
   set a first flag to a first value in response to the controller being configured to determine the first time since powering off the integrated circuit is not greater than the minimum time;
   not allow the authentication operation of the integrated circuit in response to the first flag being the first value;
   wait until the data read from the at least one memory cell in the first memory cell array is not equal to the data written to the at least one memory cell in the first memory cell array;
   determine the first time since powering off the integrated circuit is greater than the minimum time in response to the controller being configured to determine the data read from the at least one memory cell in the first memory cell array is not equal to the data written to the at least one memory cell in the first memory cell array;
   set the first flag to a second value in response to the controller being configured to determine the first time since powering off the integrated circuit is greater than the minimum time, the second value being different from the first value; and allow the authentication operation of the integrated circuit in response to the first flag being the second value.

14. The integrated circuit of claim 11, wherein the controller configured to determine whether the data read from the at least one memory cell in the first memory cell array is equal to the data written to the at least one memory cell in the first memory cell array comprises:
the controller being configured to determine the data read from the at least one memory cell in the first memory cell array is not equal to the data written to the at least one memory cell in the first memory cell array.

15. The integrated circuit of claim 14, wherein the controller configured to determine whether to allow the authentication operation of the integrated circuit in response to reading data from the second memory cell array comprises:
the controller being configured to determine whether data read from at least one memory cell in the second memory cell array is equal to data written to the at least one memory cell in the second memory cell array in response to the controller being configured to determine the data read from the at least one memory cell in the first memory cell array is not equal to the data written to the at least one memory cell in the first memory cell array.

16. The integrated circuit of claim 15, wherein the controller configured to determine whether the data read from the at least one memory cell in the second memory cell array is equal to the data written to the at least one memory cell in the second memory cell array comprises:
the controller being configured to determine the data read from the at least one memory cell in the second memory cell array is not equal to the data written to the at least one memory cell in the second memory cell array.

17. The integrated circuit of claim 16, wherein the controller configured to determine whether to allow the authentication operation of the integrated circuit in response to reading data from the second memory cell array further comprises the controller being configured to:
determine a first time since powering off the integrated circuit is greater than a minimum time in response to the controller being configured to determine the data read from the at least one memory cell in the second memory cell array is not equal to the data written to the at least one memory cell in the second memory cell array;
set a first flag to a first value in response to the controller being configured to determine the first time since powering off the integrated circuit is greater than the minimum time; and
allow the authentication operation of the integrated circuit in response to the first flag being the first value.

18. The integrated circuit of claim 17, wherein the controller configured to determine whether the data read from the at least one memory cell in the second memory cell array is equal to the data written to the at least one memory cell in the second memory cell array comprises:
the controller being configured to determine the data read from the at least one memory cell in the second memory cell array is equal to the data written to the at least one memory cell in the second memory cell array.

19. The integrated circuit of claim 18, wherein the controller configured to determine whether to allow the authentication operation of the integrated circuit in response to reading data from the second memory cell array further comprises the controller being configured to:
determine the first time since powering off the integrated circuit is not greater than the minimum time in response to the controller being configured to determine the data read from the at least one memory cell in the second memory cell array is equal to the data written to the at least one memory cell in the second memory cell array;
set the first flag to a second value in response to the controller being configured to determine the first time since powering off the integrated circuit is not greater than the minimum time, the second value being different from the first value; and
not allow the authentication operation of the integrated circuit in response to the first flag being the second value.

20. An integrated circuit, comprising:
a first memory cell array comprising:
a first array of volatile memory cells having a first retention data time; and
a controller coupled to the first memory cell array, the controller being configured to:
write a logic 1 as data to each memory cell in the first memory cell array in response to the integrated circuit being successfully logged into;
read data from each memory cell in the first memory cell array in response to the integrated circuit being connected to a supply voltage after being disconnected from the supply voltage; and
determine whether to allow an authentication operation of the integrated circuit in response to reading data from each memory cell in the first memory cell array and after the integrated circuit is connected to the supply voltage after being disconnected from the supply voltage.

* * * * *